United States Patent
Greubel et al.

[11] Patent Number: 5,868,499
[45] Date of Patent: Feb. 9, 1999

[54] LINEAR GUIDING UNIT

[75] Inventors: Roland Greubel, Ramsthal; Bernhard Keller, Wasserlosen-Kaisten; Werner Blaurock, Niederwerrn, all of Germany

[73] Assignee: Deutsche Star GmbH, Schweinfurt, Germany

[21] Appl. No.: 922,730

[22] Filed: Sep. 3, 1997

[30] Foreign Application Priority Data

Sep. 6, 1996 [DE] Germany ............... 196 36 270.9
Apr. 4, 1997 [DE] Germany ............... 297 06 034.1

[51] Int. Cl.$^6$ ................................................. G16C 29/08
[52] U.S. Cl. ......................................... 384/15; 384/41
[58] Field of Search ............................... 384/15, 42, 41, 384/44, 43

[56] References Cited

U.S. PATENT DOCUMENTS

| | | |
|---|---|---|
| 1,500,116 | 7/1924 | Dowd . |
| 4,396,235 | 8/1983 | Teramachi . |
| 4,417,771 | 11/1983 | Teramachi . |
| 4,934,835 | 6/1990 | Albert . |
| 5,200,014 | 4/1993 | Peters . |
| 5,303,638 | 4/1994 | Green . |
| 5,308,168 | 5/1994 | Yamaguchi et al. . |
| 5,501,528 | 3/1996 | Agari et al. . |

FOREIGN PATENT DOCUMENTS

| | | |
|---|---|---|
| 0135041 | 3/1985 | European Pat. Off. . |
| 0263215 | 4/1988 | European Pat. Off. . |
| 0318980 | 6/1989 | European Pat. Off. . |
| 0340751 | 11/1989 | European Pat. Off. . |
| 0384032 | 8/1990 | European Pat. Off. . |
| 0388586 | 9/1990 | European Pat. Off. . |
| 0442859 | 8/1991 | European Pat. Off. . |
| 0447379 | 9/1991 | European Pat. Off. . |
| 0345506 | 7/1992 | European Pat. Off. . |
| 0492750 | 7/1992 | European Pat. Off. . |
| 0213160 | 9/1992 | European Pat. Off. . |
| 0515715 | 12/1992 | European Pat. Off. . |
| 0536799 | 4/1993 | European Pat. Off. . |
| 0540015 | 5/1993 | European Pat. Off. . |
| 0542211 | 5/1993 | European Pat. Off. . |
| 0711928 | 5/1996 | European Pat. Off. . |
| 0713748 | 5/1996 | European Pat. Off. . |

(List continued on next page.)

OTHER PUBLICATIONS

Prospectus "Wir stellen vor: Der ganz andere Kolbenstangenlose Zylinder!" (1 page) (undated).
Promotional Material "DynaMec—neue kolbenstangenlose Linearantriebe von Festo", 14 pages (undated).
Promotional Material "Mannesmann Rexroth Koblenstangenloser Zylinder φ 25, 32 und 50 mm" (2 pages) (undated).
Promotional Material "NSK–RHP" (3 pages) (dated Feb. 1995).
Promotional Material "Intellegente Automatisierungstechnik noch produktiver gemacht" (2 pages) (undated).
Catalog "Einfache und Doppel–Kugelführungen", front and bacck pages and pp. 34–40, 1974.
Handbook of Fastening and Joining of Metal Parts, V.H. Laughner & A.G.Hargan, 1956, Cover page and pp. 541–542.

Primary Examiner—Lenard A. Footland
Attorney, Agent, or Firm—Baker & Botts. L.L.P.

[57] ABSTRACT

A linear guiding unit comprises a guide housing (10). Inside the guide housing (10) there are provided linear ball bearings by which a carriage (40) is guided. Moreover, a pneumatic drive (56) is accommodated within the guide housing (10). The pneumatic drive comprises a cylinder cavity (58) inside the guide housing (10). The cylinder cavity (58) accommodates a piston (60). The piston (60) is movable along the cylinder cavity (58). The piston (60) is connected with the carriage (40) by a flexible rope (74). This flexible rope is sealingly passed through cover walls (66) of the cylinder cavity (58). The rope is deviated outside the cylinder cavity (58) and is fixed to the carriage (40). A cover belt (90) different from the rope covers a longitudinal opening (31) of the guide housing (10) through which the carriage can be connected with an object for common axial movement.

57 Claims, 19 Drawing Sheets

FOREIGN PATENT DOCUMENTS

| | | |
|---|---|---|
| 2522092 | 8/1983 | France . |
| 1940784 | of 0000 | Germany . |
| 273384 | 4/1914 | Germany . |
| 763225 | 1/1954 | Germany . |
| 1046415 | 12/1958 | Germany . |
| 2404244 | 8/1975 | Germany . |
| 3146330 | 10/1985 | Germany . |
| 3428680 | 2/1986 | Germany . |
| 3815595 | 11/1989 | Germany . |
| 3914889 | 11/1990 | Germany . |
| 3931139 | 3/1991 | Germany . |
| 9113044 | 1/1992 | Germany . |
| 4027637 | 3/1992 | Germany . |
| 4029721 | 3/1992 | Germany . |
| 4111551 | 10/1992 | Germany . |
| 4137789 | 5/1993 | Germany . |
| 4322821 | 1/1994 | Germany . |
| 4226604 | 2/1994 | Germany . |
| 4318932 | 12/1994 | Germany . |
| 4301435 | 1/1995 | Germany . |
| 927780 | 5/1995 | Germany . |
| 4041370 | 6/1995 | Germany . |
| 4417136 | 11/1995 | Germany . |
| 4301434 | 3/1996 | Germany . |
| 5578820 | 5/1980 | Japan . |
| 61-180018 | 8/1986 | Japan . |
| 63-156633 | 6/1988 | Japan . |
| 63-147927 | 9/1988 | Japan . |
| 222186 | 6/1990 | Japan . |
| 2309011 | 12/1990 | Japan . |
| 470437 | 6/1992 | Japan . |
| 7190056 | 7/1995 | Japan . |
| 583384 | 12/1976 | Switzerland . |
| 591641 | 9/1977 | Switzerland . |
| WO9309356 | 5/1993 | WIPO . |

LINEAR GUIDING UNIT

BACKGROUND OF THE INVENTION

This invention concerns a linear guiding unit comprising an elongate guide housing having a longitudinal axis and wall means confining a guiding cavity, said wall means confining at least one longitudinal opening of said guiding cavity. The linear guiding unit further comprises at least one carriage guided within said guiding cavity by sliding or/and rolling means, said carriage being connectable through said longitudinal opening with an object to be guided along said longitudinal axis.

Linear guiding units of this type are used e.g. in machine tool assemblies for guiding a machine tool element or an object to be shaped by such a machine tool element. Frequently, it is necessary to provide driving means for moving said carriage along said longitudinal axis in accordance with a predetermined program of movement. Various types of driving means may be used. It is possible e.g. to use a cylinder piston device as driving means. If using such a cylinder piston device the cylinder component of the cylinder piston device may be integrated into the guide housing.

STATEMENT OF THE PRIOR ART

A linear guiding unit is e.g. known from European Patent 0 384 032 B1. In this known linear guiding unit the cylinder is integrated into the guide housing, and a piston without a piston rod is movably housed within the guiding cavity for moving therein in parallel with the longitudinal axis. The movement of the piston is obtained by introducing and withdrawing fluid such as a gas or a liquid into and from working chambers on both sides of the piston. The flexible pulling member is a belt. The belt is connected to the piston and is guided through fluid sealing means at both ends of the cylinder. This belt is guided toward the carriage around deviating means which are provided at both ends of the guide housing. The belt runs between said deviating means and said carriage inside a slot of the guide housing, in which slot the carriage is guided. There is no hint as to a complete encapsulation of the guiding cavity.

From German Publication DE 38 15 595 A1 a linear guiding unit comprising a belt drive is known. In this linear guiding unit the belt forms a loop. This loop is tensioned between respective deviating rollers at both ends of the guide housing. One portion of this loop, which portion is drivingly connected with the carriage, runs along the longitudinal opening and forms by its longitudinal edges labyrinth sealing means which engage sealing and guiding grooves of plastic profiles, which plastic profiles confine the longitudinal opening. Another portion of the loop runs inside the guide housing in a covered return channel at the underside of a bottom wall of the guide housing.

OBJECT OF THE INVENTION

It is an object of the present invention to provide an improved encapsulation of the sliding or/and rolling means and of portions of the flexible pulling means inside the guiding cavity.

SUMMARY OF THE INVENTION

A linear guiding unit comprises an elongate guide housing having a longitudinal axis and wall means defining a guiding cavity. These wall means confine at least one longitudinal opening of the guiding cavity. The linear guiding unit further comprises at least one carriage guided inside the guiding cavity by sliding or/and rolling means. This carriage is connected through said longitudinal opening with an object to be guided in parallel with said longitudinal axis. Inside the guide housing there is provided adjacent the guiding cavity at least one fluid cylinder cavity extending substantially parallel to said longitudinal axis of said guide housing. Inside this fluid cylinder cavity there is accommodated a piston. This piston is drivingly connected with the carriage through at least one flexible pulling member. The flexible pulling member runs from the piston through at least one fluid sealing means provided adjacent a terminal area of the fluid cylinder cavity. Further, this flexible pulling member runs from the fluid sealing means around pulling member deviating means provided adjacent a respective terminal area of the guide housing toward the carriage.

Sliding or/and rolling means accommodated inside the guiding cavity and portions of the pulling member accommodated within the guiding cavity are substantially completely encapsulated inside the guiding cavity in using flexible covering means covering said longitudinal opening, said flexible covering means being provided in addition to said flexible pulling member.

By the construction principle of this invention the following advantages are achieved: The guiding cavity in which the sliding or/and rolling means for the carriage are accommodated and in which further at least parts of the pulling member attached to the piston and the driving the carriage are accommodated is substantially completely encapsulated by said flexible covering means. These flexible covering means are at least partially exposed to dirt and dust from the surroundings in the area of the longitudinal opening. If dirt or dust has access to the outer side of the flexible covering means, this dirt and dust is present substantially only on the outer side of the covering means. A transition of dirt and dust from the outer side of the covering means is according to the respective detail construction not completely excluded; this transition is, however, reduced to such an extent that during usual operating periods dirt or dust contact with the sliding or/and rolling means which could result in damage or destruction of the sliding or/and rolling means is avoided. Moreover, the flexible pulling members running from the carriage through the respective deviating means and the respective fluid sealing means into the fluid cylinder cavity and toward the piston are essentially encapsulated. Such, these portions of the flexible pulling members are not exposed to a direct risk of contamination. The possibility that dirt and dust find access to these flexible pulling members through leakage openings is at least small. This is of importance: The flexible pulling members which are introduced into the fluid cylinder cavity through the fluid sealing means are in sliding engagement with the fluid sealing means provided at the terminal areas of the fluid cylinder cavity. If these pulling members were exposed to dirt and dust when running outside the fluid cylinder cavity, the dirt or dust e.g. in the form of swarf or chips could effect an early damaging or destruction of the fluid sealing means.

The basic concept of the invention is to provide separate covering means for the longitudinal opening in avoiding the concept of using the pulling members which connect the piston with the carriage for covering purposes. This concept of the invention appears very strange and therefore inventive when considering the situation of a man skilled in the art. For a man skilled in the art it would have been much more obvious in consideration of EP 0 384 032 B1 and of German Publication 38 15 595 A1 to use—in accordance with DE 38 15 595 A1—the flexible pulling member for covering the longitudinal opening of EP 0 384 032 B1 when trying to improve the encapsulation in an embodiment according to EP 0 384 032 B1. Due to the concept of the present invention all critical components of the linear guiding unit and more particularly the flexible pulling members extending through fluid sealing means can be kept free of dirt and dust. The inventors have found that the considerable constructional expense resulting from separate covering means besides the flexible pulling members is justified.

The guide housing can be, as known from the above-mentioned prior art, formed with a bottom wall and two side walls and with a longitudinal opening between areas of said side walls which are remote from the bottom wall. Inside the guiding cavity a guide rail can be fastened with a foot portion thereof on the bottom wall and preferably inside a foot portion receiving groove of the bottom wall. Thus, the guide housing and the guide rail can be manufactured separately. The guide housing can be e.g. provided as an extruded profile with little costs. This guide housing can e.g. extruded from aluminium or other light metal. On the other hand, the guide rail which has to fulfill the essential guiding functions can e.g. be made of steel. Thus, the guide rail is not sensible against wear and can be made with high precision at least in the area of the foot portion thereof and in the areas of the guiding tracks. Outer faces of the walls forming the guide housing can be provided with affixing grooves during the extrusion process. These affixing grooves may be used to affix the guide housing to a superordinated carrier construction or a roboter construction.

The linear guiding units of this invention can be used for various purposes, e.g. for guiding machine tool components such as tool elements. They can further be used for guiding objects to be treated on machine tools. Further, the linear guiding units of this invention can be used for guiding measuring instruments or objects to be measured in measuring and test installations. Further, the guiding units of this invention can be used in roboters in which an executing instrument is to be moved in longitudinal direction.

The carriage can be guided within the guide housing on at least one guide rail through a runner member. This runner member can be shaped with a bridge portion extending across a head portion of the guide rail and with two flange portions adjacent lateral faces of the guide rail. This construction results in especially stable guiding conditions of the runner member with respect to the guide rail. "Stable" means that considerable forces and torques can be transferred.

Movability without substantial friction and high precision of guiding of the carriage can be obtained in that at least one runner member is guided on the guide rail by at least one endless loop of roller bodies, which roller bodies are engaged with a roller track of the guide rail, on the one hand, and with a roller track of the runner member, on the other hand. Such a loop comprises a load transmitting group of rollers, a returning group of rollers and two arc-shaped groups of rollers. Besides such an embodiment other guiding systems are possible. It is e.g. possible that both side walls of the guide housing are provided with respective roller tracks on the inner side faces thereof and that the carriage is provided with two groups of rollers, one group of rollers being in rolling engagement with the roller track on one of the side walls and a further group of rollers being in rolling engagement with the roller track on the other side wall. In this latter embodiment the roller tracks can be provided by separately manufactured components as e.g. guiding wires or guiding rods with circular cross-section. It is further posssible, however, that the rollers run on roller tracks which are directly shaped in the material of the guide housing.

As far as the flexible covering means are concerned, various alternatives are possible.

According to a first alternative the flexible covering means comprise at least one movable covering belt. A covering portion of this covering belt covers said at least one longitudinal opening. This covering belt is in driving connection with the carriage in the area of said at least one longitudinal opening and is deviated by covering belt deviation means in at least one terminal area of the guide housing. More particularly, a return portion of the at least one covering belt may extend between respective covering belt deviation means at both terminal areas of the guide housing. This covering belt return portion may be located outside the guiding cavity. Preferably, the return portion of the covering belt runs through a covering belt return channel of the guide housing.

In accordance with the above-discussed prior art it is possible that the movable covering belt, the fluid cylinder space, the flexible pulling members and the longitudinal opening are substantially symmetrically positioned with respect to a middle plane parallel to the longitudinal axis of the linear guiding unit. As a result thereof one can say that in a sectional plane orthogonal with respect to the longitudinal axis the longitudinal opening with the covering portion of the covering belt, a portion of the flexible pulling member connected with the carriage, a portion of the flexible pulling member connected with the piston and a return portion of the covering belt are arranged side by side in the sequence of the enumeration. In practice, the geometrical relative arrangement of the various components will be selected in consideration of the respective use and in consideration of the loads and the geometric situation. When considering these points of view the at least one longitudinal opening and the at least one covering belt, on the one hand, and the at least one fluid cylinder space and the at least one flexible pulling member may be located in two different planes in parallel to each other and in parallel to the longitudinal axis. If one looks for a construction in which the linear guiding unit is flat, i.e. has a relatively long cross-sectional axis and a relatively short corss-sectional axis, one can select a construction as follows: A fluid cylinder space with an associated flexible pulling member is provided in an intermediate plane between two parallel external planes. To each of said external planes a covering belt is associated. In each of said external planes a runner member of the carriage may be guided and the two runner members may be interconnected by a cross piece. Thus, one obtains a very flat linear guiding unit which is highly resistant to torques. In such an embodiment two longitudinal openings occur which may be separated from each other by a covering plate. This covering plate may be affixed adjacent its end portions remote from each other along the longitudinal axis of the guide housing to terminal areas of the guide housing. They may be, if desired, connected to these terminal areas of the guide housing through transverse members. In case of linear guiding units having a very large guiding length of e.g. some meters, one can apply a tensional force to the covering plate, such as to avoid a sagging of the covering plate.

Besides the just discussed alternative of movable covering means there is a further alternative according to which the flexible covering means are stationary covering means which are secured with respect to the guide housing at the terminal areas thereof which are remote from each other along the longitudinal axis of the guide housing. These stationary covering means may run through the carriage in the direction of the longitudinal axis of the guide housing. According to this alternative, the number of mechanical components implied in the construction of the guide housing and the number of components attached to the terminal areas of the guide housing is reduced. On the other hand, the design of the carriage becomes more complicated, especially in cases where a perfect sealing action is required. The stationary covering means may again be formed as a covering belt. This covering belt may consist of rubber, plastics material or metal. The same materials may be used in the above-discussed embodiment with movable covering belts.

The encapsulation effect may still be improved in that the stationary covering means are provided with mechanical or/and magnetic adherence means near the edge zones of the stationary covering means. By this design a high encapsulation quality can be achieved at the respective location where during movement of the carriage the covering belt enters or leaves a connecting piece connecting a runner member with an object to be moved.

Moreover, the encapsulation quality can be improved in that the stationary covering means extend through a guiding channel of the carriage, which channel has its axially remote ends in a plane defined by the covering position of the stationary covering means with respect to the longitudinal opening.

As far as the flexible pulling members are concerned, which drivingly connect the piston with the carriage, one should provide a design of a cross-sectional avoiding edges as far as possible. E.g., one can obtain by rounded edges or transitions that the wear of the pulling members and the wear of the associated fluid sealing means are small and that a substantially constant pressure of engagement exists along the total periphery of the cross-section of the flexible pulling members.

The fluid cylinder space and the piston may have a circular cross-section; it is, however, possible to use other cross-sectional designs and more particularly elliptical or oval cross-sectional designs.

The assembling of the linear guiding unit may become more difficult, if—besides the flexible pulling members which require respective deviation means at the terminal areas of the guide housing—separate covering means are to be provided and in particular, if movable covering means are to be used which must also be provided with deviation means. In order to reduce the difficulties of assembling it is therefore further proposed that at least one deviation means, namely at least one pulling member deviation member or at least one covering belt deviation means is provided in a terminal encapsulation means such that the respective deviation means can be mounted in the respective terminal area of the guide housing independently from the respective encapsulation means, said deviation means being mounted before said encapsulation means. Then, the associated flexible pulling means or the covering belt, respectively, can be applied to the premounted deviation means and only thereafter the respective encapsulation means are to be mounted. In this way it is possible that the flexible pulling member or/and the covering means are only applied after the associated deviation means have already been mounted. The respective flexible pulling member or/and covering means can be applied before the respective encapsulation means are attached. More particularly, it is possible that a pulling member deviation means and a covering belt deviation means are mounted independently from each other in a terminal area of the guide housing and thereafter the encapsulation means.

According to a further aspect, the present invention relates to a rail unit for a linear guiding unit. This rail unit comprises a rail carrier having a rail carrier longitudinal axis and at least one guide rail, said guide rail having a rail axis substantially in parallel with respect to the rail carrier longitudinal axis, wherein the guide rail is intended for guiding at least one runner member of the linear guiding unit along the longitudinal axis thereof. The guide rail has—when regarded in cross-section—a normal axis, a foot portion, a head portion and lateral faces with guiding tracks on both sides of the normal axis. The foot portion lies with at least one foot portion standing face on at least one foot portion application face of the rail carrier and is secured to the rail carrier by securing means adapted for transmission of at least vertical securing forces.

Such rail units are known e.g. from

U.S. Pat. No. 4,417,771

U.S. Pat. No. 5,501,528

DE 44 17 136 A1

EP 0 340 751 A2 and from

Japanese publication 2-309011 corresponding to the Japanese patent application 1-1305751-130575 of May 24, 1989.

From EP 0 384 032 B1 and from EP 0 492 750 A1 rail units are known in which the rail carrier and the rail are formed as a monopiece profile. A base portion of this monopiece profile accommodates an elliptical cylinder channel. In an upper portion of the profile there are provided guiding tracks for slidingly guiding a carriage. A piston is guided within the cylindrical channel. The piston defines inside the cylindrical channel two working chambers which are closed at the end of the cylindrical channel. The cylindrical channel is closed at its ends by terminal covers. A flexible pulling member is guided through these terminal covers. This flexible pulling member is guided at both terminal areas of the cylindrical channel around deviation means and is connected with the carriage for moving said carriage.

In the known design according to EP 0 384 032 B1 a relatively flat cross-sectional design is obtained by the monopiece integration of the rail carrier and the guide rail in spite of the fact that the rail carrier additionally accommodates the cylindrical channel. The relatively small height is of considerable importance for situations of use in which the rail unit must be accommodated in narrow spaces. On the other hand, advantages could also result from separate manufacturing of the rail carrier and of the guide rail, a solution which is known e.g. from EP 0 340 751 A2. In this known solution the rail carrier can be manufactured as an extruded profile, e.g. from light metal with low expense and, on the other hand, the guide rail can be manufactured from steel so that its guiding tracks can be treated with high precision and can have a high degree of hardness.

Therefore it is a further object of the invention to provide a type of rail unit in which a cylindrical channel of a cylinder piston device may be combined with a separately manufactured guide rail while maintaining a relatively small total height in the direction of the normal axis and, nevertheless, avoiding the risk of deformation of the cylincdrical channel due to securing or/and operational forces between the guide rail and the guide carrier, when, in view of the requirement of small vertical height, the foot portion application face of the rail carrier is close to the cylindrical channel.

In view of this object it is proposed that—when a cylindrical channel is accommodated within the rail carrier on that side of the foot portion application face which is remote from the head portion of the guide rail and when the apex area of the cylindrical channel is close to the guide rail and close to the normal axis—the transmission of vertical securing forces occurs at least partially in areas remote from the normal axis where the wall thickness of the separating wall between the foot portion application face and the cylindrical channel is increased.

In other words: In accordance with the embodiment of this invention the cylinder profile of the cylindrical channel is used for transmitting the vertical securing forces within the thickened areas of the separating wall while minimizing the distance between the foot portion application face and the apex area of the cylindrical channel, such as to minimize the total height of the unit along the normal axis.

For obtaining a lateral positioning of the guide rail with respect to the rail carrier one can provide a contact between a side face of the foot portion and a side face application face of the rail carrier. The side face application face can be a lateral face confining a groove which is provided in the separating wall and accommodates the foot portion of the guide rail. The at least one side face application face can be an adjusting face which takes care of parallelization of the rail carrier longitudinal axis and of the rail longitudinal axis, when the foot portion side face is applied to the side face application face.

For giving an idea of the geometry of the rail carrier it should be noted that the height dimension of the securing means can be substantially reduced to the height of the at least one side face application face when measured in the direction of the normal axis.

Preferably, the securing means are obtained by mutually adapted profile structures of the at least one foot portion side face and the associated side face application face of the rail carrier. It is to be noted, however, that other possibilites exist: E.g. the foot portion can be shaped as a flange portion extending substantially orthogonally with respect to the normal axis; this flange portion can be secured to the rail carrier by bolts extending through edge zones of the flange portions.

The term "securing forces" which are to be transmitted in a distance from the normal axis covers those forces, on the one hand, which occur when securing the rail to the rail carrier; on the other hand, this term covers also such forces which occur in operation.

When the securing of the guide rail on the guide rail carrier is to be obtained by profile structure engagement, one can provide a dove-tail-shaped engagement between the at least one foot portion side face and the associated side face application face of the rail carrier.

A preferred way of securing the guide rail to the guide rail carrier comprises a plastic deformation of the material of the guide rail carrier for obtaining contact of the at least one foot portion side face and the associated side face application face. This plastic deformation can be performed with a step area of the guide rail carrier which is confined by the side face application face. By such a plastic deformation one can simultaneously obtain a contact between the foot portion standing face and the foot portion application face. Moreover, by this deformation the guide rail can be axially secured with respect to the guide rail carrier.

The plastic deformation can be obtained e.g. by embossing a notch close to the side face application face. Preferably a notch is embossed which is stable even without filling means contained therein. The shape of the notch is preferably adapted to the shape of the side face application face in consideration of the necessary deformation path of the side face application face. In case of a dove-tail-shaped engagement between the side face application face and the associated foot portion side face, a V-shaped notching is proposed. A substantially uniform approaching of the side face application face to a dovetail-shaped foot portion side face can be obtained, if the V-shaped notching provides a first flank substantially parrallel to the normal axis and more remote from the normal axis and a second flank closer to the normal axis and substantially parallel to the side face application face. By such formation of the V-shaped notching one can obtain a contact pressure effect substantially through the total height of the side face application face. This is desirable for a good securing of the guide rail with respect to the guide rail carrier.

In view of a good securing engagement of the foot portion with respect to the guide rail carrier it is further recommended that the depth of notching substantially corresponds to the height of the side face application face along the direction of the normal axis. By such dimensioning of the notch one can—in case of a dove-tail shape of the foot portion—obtain a clamping effect even along the edges of the dove-tail formation.

Frequently, the profiles of the guide rails are symmetrical with respect to the normal axis in view of adaptation to usual runner designs. Accordingly, on can make the foot portion symmetrically dovetail-shaped such that both foot portion side faces are applied to a respective side face application face.

It is possible that the deformation used for securing the guide rail is made on one side only of the guide rail or on both sides. In manufacturing the rail carrier e.g. by extrusion one can obtain side face application faces having sufficient precision for being used as adjusting faces. Then, one foot portion side face can be applied to such a highly precise adjusting face. In this case, the further securing can be obtained in that the opposite side face application face is deformed towards the associated foot portion side face.

When, however, the side face application faces are not sufficiently precise for imparting a desired linearity or straightness to the guide rail, one can also consider that both side face application faces are approached to the respective foot portion side faces. In this case, the position of the guide rail can be adjusted during the deformation process by additional adjusting means. E.g. one can position the guide rail carrier on a mounting bench with lateral play and adjust the guide rail with respect to a reference ruler provided on the mounting bench.

The notching can provide a continuous deformation trace in the longitudinal direction of the rail carrier axis. Such a continuous deformation trace can be obtained e.g. by a notching wheel which is moved along the longitudinal axis of the guide rail carrier. Alternatively, it is also possible that the plastic deformation is made by individual deformation dots spaced along the longitudinal axis of the guide rail carrier. These individual deformation dots may overlap each other in axial direction.

Possibly, it is intended that at a later date the guide rail and the guide rail carrier are separated from each other, e.g. in case of a rebuild or a repair. If this is intended, the deformation is preferably made with individual deformation dots. These individual deformation dots can be eliminated at said later date, e.g. by drilling.

The deformation method can be performed by simultaneously passing the rail carrier and the guide rail through a stationary deformation device. In this deformation device there may be provided a roller guide system for the rail carrier and a roller guide system for the guide rail. The roller guide system for the guide rail can be designed similar to a runner member with the only difference that this runner member is mounted stationarily. The roller guide system for the guide rail carrier can be designed such that respective groups of guiding rollers are applied to three longitudinal faces of the rail carrier which are orthogonal with respect to each other. By adjustment of the roller guide system of the guide rail, on the one hand, and of the roller guide system of the rail carrier, on the other hand, a correct adjustment of the guide rail with respect to the rail carrier can be obtained; hereupon, the deformation or deformations can be made by a notching wheel or a dot-wise acting notching tool. The precision which can be obtained is increased by increasing the guiding length in which the rail carrier and the guide rail are guided.

It is further possible that a running deformation device is moved along the rail carrier or along the guide rail and that a notching wheel or a dot-wise acting notching tool are provided on the moving deformation device. This moving deformation device can also be built such that it is guided on both a profile of the rail carrier and a profile of the guide rail. Such, one can automatically obtain an adjustment of the guide rail with respect to the rail carrier.

One should always have in mind that the rail carrier and the guide rail have frequently large axial lengths of e.g. 6 m and more.

As far as the relative dimensions of the profile cross-section are concerned, one should consider that the wall thickness of the separating wall close to the normal axis corresponds substantially to the height of the at least one foot portion application face along the normal axis.

The cross-section of the cylindrical channel can be safely kept free from securing forces, if the foot portion is supported by its standing face on said at least one foot portion application face only in areas spaced from said normal axis. This can be obtained in that the foot portion standing face or/and the foot portion application face are provided in the area of the normal axis with a recess or recesses, respectively. It is not excluded, however, that the foot portion standing face is supported throughout its face area on the foot portion application face of the rail carrier. If a good planeness of the foot portion application face and of the foot portion standing face exists, one can even in case of full face contact (without recess or recesses) obtain transmission of an essential part of the securing forces outside the most critical area of the cylinder cross-section.

It is not to be excluded that instead of or besides mechanical securing means for securing the guide rail to the guide rail carrier, the guide rail can be secured otherwise to the guide rail carrier, e.g. by welding. Welding is only possible, if the respective pair of materials are accessible to a welding and if a possibility of heat removal exists. As a rule, the securing of the guide rail to the rail carrier by an adhesive or filler is easier to be performed, if this adhesive or filler can be applied in liquid or pasty condition. One can e.g. use resins like epoxy resins or polyurethane resins. These types of resins can be applied as 2-component-adhesives which can easily be introduced in a highly liquid condition into the respective securing locations and can, nevertheless, generate a high adhesive force within short. Such a fast movement through a treatment station is possible. The application of the adhesive or filler can be performed in thin layers or thicker layers. Thin layers can be used, if only an adhesive function is expected. Thicker layers can be used, if a filler function is expected after a preceding adjustment of the guide rail with respect to the rail carrier. E.g., the adhesive or filler can be filled in a preshaped groove of the rail carrier either before or after the guide rail has been lowered into the groove. The adjustment of the guide rail can in this case be performed before the filling step. Alternatively, the adjustment can also be performed during the setting period of the adhesive or filler, if this setting period is relatively long.

It is also possible that securing by adhesive or filler is combined with a positive engagement. Such, it is possible that the deformation of the side face application face towards the foot portion side face is performed as described above either before the introduction of the adhesive or filler or after the application of the adhesive or filler. If one decides to make the deformation of the side face application faces after the adhesive or filler has been introduced, one should take care that the deformation is performed at a date at which the adhesive or filler are still sufficiently liquid or pasty. Thus, one can avoid that an adhesive or filler already set to a considerable extent is cracked or damaged. When selecting the adhesive or filler it should be taken care that this adhesive or filler does not substantially shrink because such shrinking could result in a loss of a preceding linear adjustment. This is particularly true, if the introduction of the adhesive or filler is made only after the approaching of the side face application faces to the foot portion side faces. Basically it is possible that the adhesive or filler is introduced between the foot portion standing face and the foot portion application face or/and between at least one foot portion side face and the associated side face application face. It is possible that the maintenance of a previous adjustment is obtained by an adhesive or a filler. In this case, the adjustment means which have been used for adjustment before filling can be temporary adjustment means which may be removed again after the adhesive or filler have been introduced. Adjustment can be performed e.g. by wedges or the like, and these wedges can be removed after the setting of the adhesive or filler.

Alternatively, screw means may be used for adjustment. Such an adjustment by screw means is described in German Publication DE 43 01 435 C2. The height adjustment and lateral adjustment as described in said German publication may also be used in connection with the present invention.

The rail carrier can be shaped e.g. as a rail carrier housing or guide housing of substantially rectangular cross-sectional shape with a bottom wall, two side walls and an opening opposite to the bottom wall. In this case, the guide rail can be secured on one of the three walls: bottom wall and side walls. Preferably, the guide rail is secured to the bottom wall which lies above the cylindrical channel.

The invention can be executed with the short axis or with the long axis of an elliptical cross-section of the cylindrical channel being in parallel to the normal axis. An arrangement such that the long axis is in parallel to the normal axis results in a high degree of stability against deformation. This is also true, if a circular cross-section is selected. An arrangement of the short axis in parallel with the normal axis results in a reduced height of the guide rail unit. Such a reduced height is desirable in many cases of application.

It is possible that during the securing of the guide rail on the rail carrier stiffening measures are applied for preventing deformation of the cylindrical channel. E.g. one can enter a stiffening body into the cylindrical channel for the period of securing. This stiffening body may be reduced to the respective longitudinal sections in which securing forces are simultaneously applied.

When the cylindrical channel has an elliptical cross-section and when the short axis of the elliptical cross-section coincides essentially with the normal axis, one should take care that vertical securing forces are applied in a distance from the normal axis, which distance is larger than about 15% and preferably larger than about 20% of the length of the long axis of the elliptical cross-section.

According to a further aspect, the present invention relates to a guide rail-rail carrier combination of a guide rail unit in which—when regarding the cross-section—the guide rail has a normal axis, a foot portion, a head portion and lateral guiding areas on both sides of the normal axis and in which the foot portion is fastened on the rail carrier by fastening means adapted for transmission at least of vertical fastening forces such that the foot portion stands with at least one foot portion standing face on at least one foot portion application face of the rail carrier. In this arrangement a cylindrical channel may be provided or not.

For positioning and/or fastening the guide rail in a positioning groove a fixation compound may be used which is introduced in a liquid or pasty condition and set hereafter.

In such an arrangement the advantages of a positive fixation of the guide rail in the positioning groove can be combined with the advantages of an adhesive fixation. This is particularly true when the fixation compound at least partially fills a gap between an undercut side face application face and an associated inclined foot portion side face. Thus, the introduction of the rail into the positioning groove is facilitated because a relatively loose engagement of the foot portion with respect to the positioning groove is possible. On the other hand, by introduction of the fixation compound the lateral play is overcome. Moreover, the fixation compound after setting is not only subject to shearing forces but additionaly subject to compressional forces, when the guide rail is loaded in a sense of lifitng it from the rail carrier or rocking it about a longitudinal axis with respect to the rail carrier.

The gap can have a gap width of about 0.5 to 2.5 mm, preferable about 1 to 2 mm.

The fixation compound can be a conventional adhesive, especially a more-component adhesive on the basis of polyurethan resins or epoxy resins.

The rail is preferably made with symmetrical profile, and this symmetrical profile is preferably also used for the rail carrier. Correspondingly, the positioning groove may have undercut foot portion application faces on both sides.

When the rail carrier and the guide rail are precisely shaped already before mutual combination, then it is most advantageous to apply one of the foot portion side faces to the associated side face application face and to fill a gap between the other foot portion side face and the associated foot portion application face with a settable fixing compound. Thus, one obtains a sufficiently precise positioning which can be easily performed. One further obtains an easy assembling of the guide rail and the guide rail carrier, and finally one obtains a fixation free of play.

According to a further aspect, this invention concerns a method of mounting a guide rail within a positioning groove. In this method one starts from a guide rail carrier with a positioning groove, which positioning groove has at least one undercut side face application face and from a guide rail which engages in assembled condition the undercut side face application face by an adapted foot portion side face.

In this method the guide rail and a liquid or pasty fixation compound are introduced into the positioning groove, the guide rail is adjusted inside the positioning groove and the fixation compound is allowed to set while maintaining the adjustment condition. The various steps of this method can be performed in various sequences: Introduction of the guide rail into the positioning groove before or after introduction of the filling mass into the positioning groove; adjustment of the guiding rail within the positioning groove before or after introduction of the fixation compound into the positioning groove.

A preferred way of proceeding is that first of all the guide rail is introduced with its foot portion into the positioning groove, that hereupon the guide rail is adjusted with respect to the rail carrier, that hereupon the fixation compound is introduced into remaining spaces inside the positioning groove and that hereupon the fixation compound is allowed to set. This sequence of steps has the advantage that no essential location of the fixation compound must be initiated after introduction of the fixation compound and that therefore the fixation compound may have a higher viscosity. The viscosity of the fixation compound must be selected only such that the remaining spaces are sufficiently filled. The principle of the defined introduction of the fixation compound can be realized such that the fixation compound is introduced into at least one of two gaps which exist between respective foot portion side faces and respective side face application faces.

A most preferred performance of the method is to adjust the guide rail within the positioning groove by applying one of its foot portion side faces against an associated side face application face and to fill thereafter a gap which remains between the other foot portion side face and the associated side face application face.

For obtaining compressional forces within the set fixation compound besides shearing forces it is proposed that the fixation compound is introduced into a gap which exists between an undercut side face application face and a correspondingly inclined foot portion side face.

The adjustment of the guide rail can be performed in that the rail carrier is pressed against an adjustment ruler of a mounting bench and that the guide rail is pressed with a foot portion side face against an associated side face application face of the positioning groove. The last-mentioned pressing action can proceed along the axis of the guide rail such that this pressing action exists always in respective longitudinal sections where the fixation compound is to be introduced. In case of this performance of the method one can regard the adjustment means as regainable adjustment means. It is, however, possible to adjust the guide rail by wedges or the like. These wedges can be removed after setting the fixation compound. It is, however, also possible to leave the wedges or the like at their respective locations after setting. In this case, one can regard the wedges as lost adjustment means.

When the foot portion of the guide rail is dovetail-shaped, e.g. with a symmetrical dovetail profile, and when the positioning groove is also dovetail-shaped, it may be impossible to insert the guide rail into the positioning groove by a movement transverse to the longitudinal axis of the guide rail. It may be rather necessary to push the guide rail into the positioning groove along the axis thereof. Then, the use of a fixation compound is very interesting because the sliding of the guide rail into the groove is facilitated: one can provide the foot portion with dimensions smaller than the dimensions of the dovetail groove.

The introduction of the fixation mass into the positioning groove and more particularly into a gap should be well controlled. One can e.g. introduce the fixation mass by applying a bead or band of liquid or pasty fixation mass at the exit of the respective gap such that this band or bead can hereupon flow into the gap.

Alternatively, it is possible to introduce the fixation compound through at least one filling channel into the gap with this filling channel extending from an inlet position outside the positioning groove toward the respective gap.

The quality of fixation by fixation compound can still be increased by introducing the fixation compound under pressure. This is possible, if one seals possible leakage zones during the injection of the fixation compound. More particularly, one can inject the fixation compound under pressure, if a filling channel is used and if the longitudinally extending exit of the gap is sealed. Possibly, also the axially remote ends of the gap may be sealed.

The various feaatures of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF A PREFERRED EMBODIMENT

Figure 1:
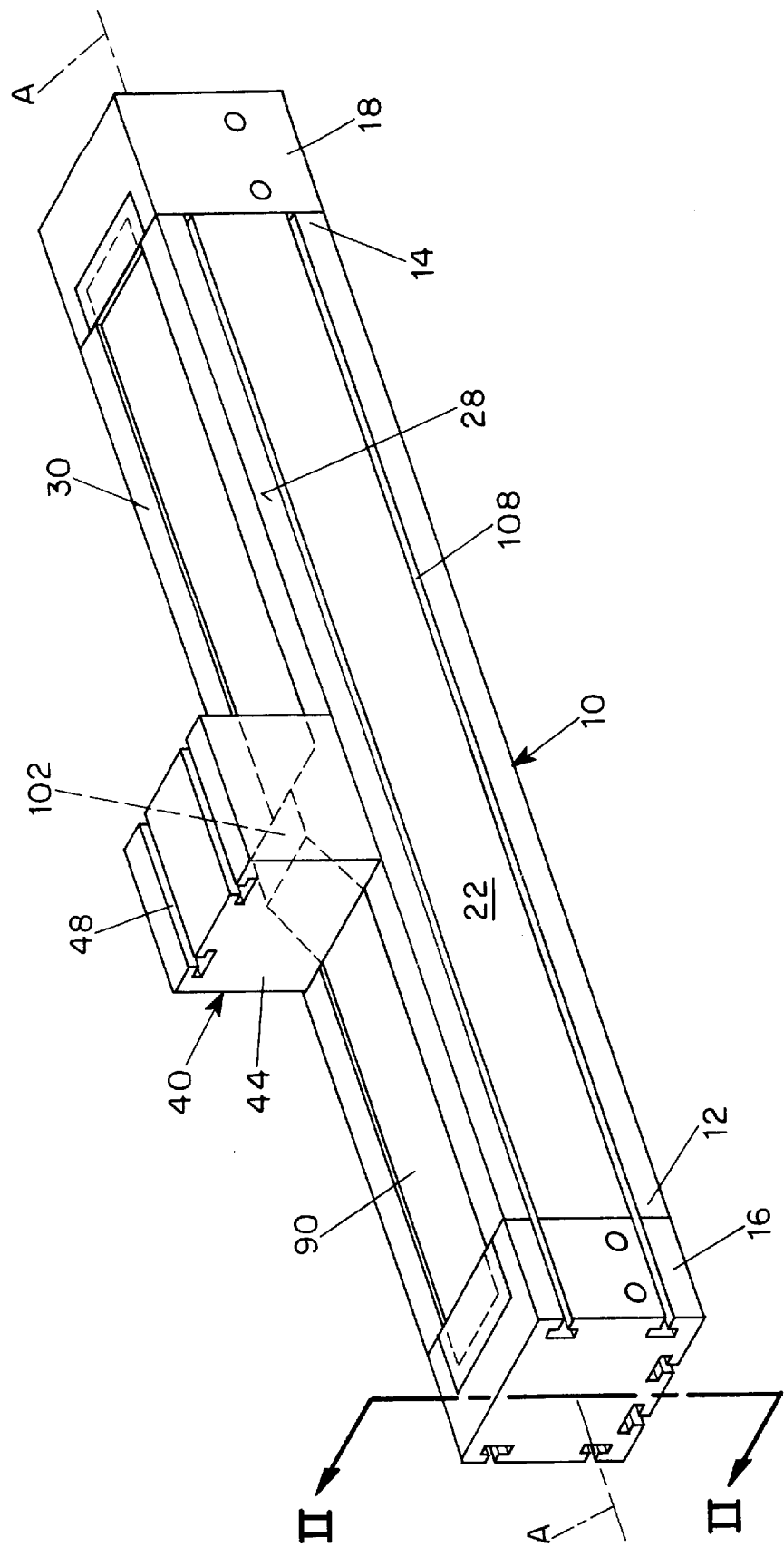
FIG. 1 shows an overal view of a linear guiding unit of the invention.

In FIG. 1 there is shown a guide housing 10. To the terminal areas of the guide housing 10 terminal boxes 16 and 18 are fastened which have preferably the same cross-sectional profile as the guide housing 10.

Figure 2:
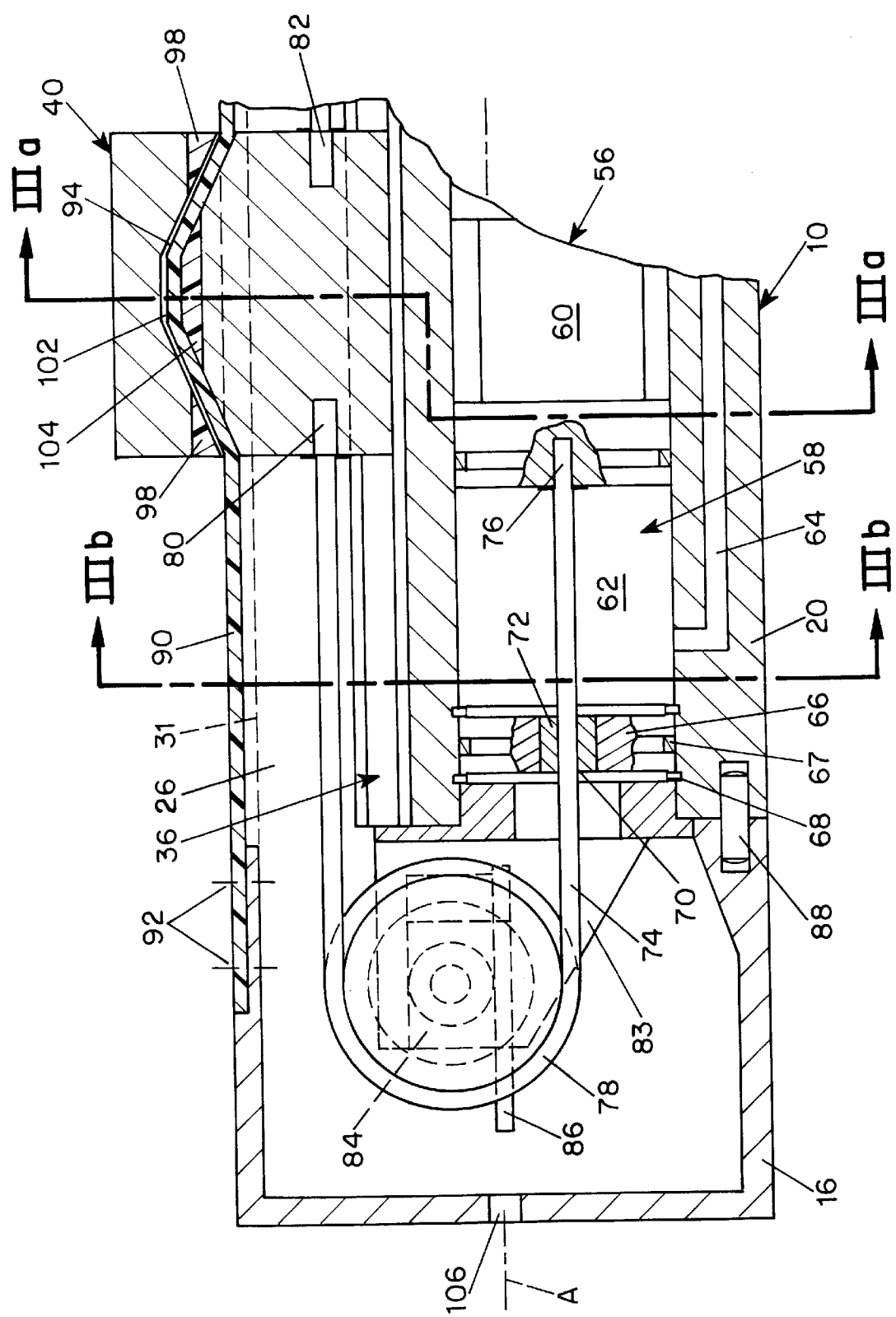
FIG. 2 a longitudinal section according to line II—II of FIG. 1.
Figure 3A:
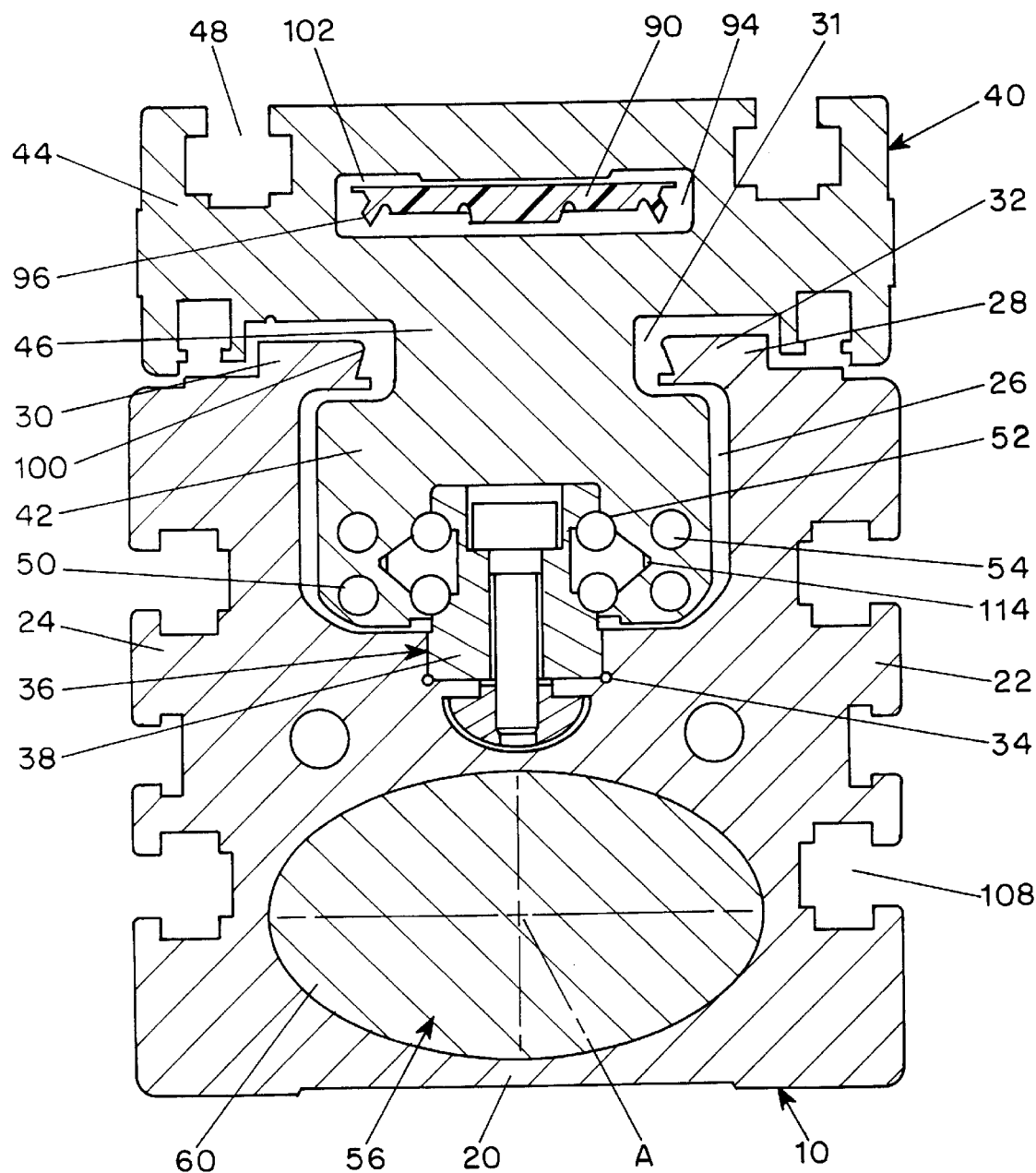
FIG. 3a a sectional view according to line IIIa—IIIa of FIG. 2.
Figure 3B:
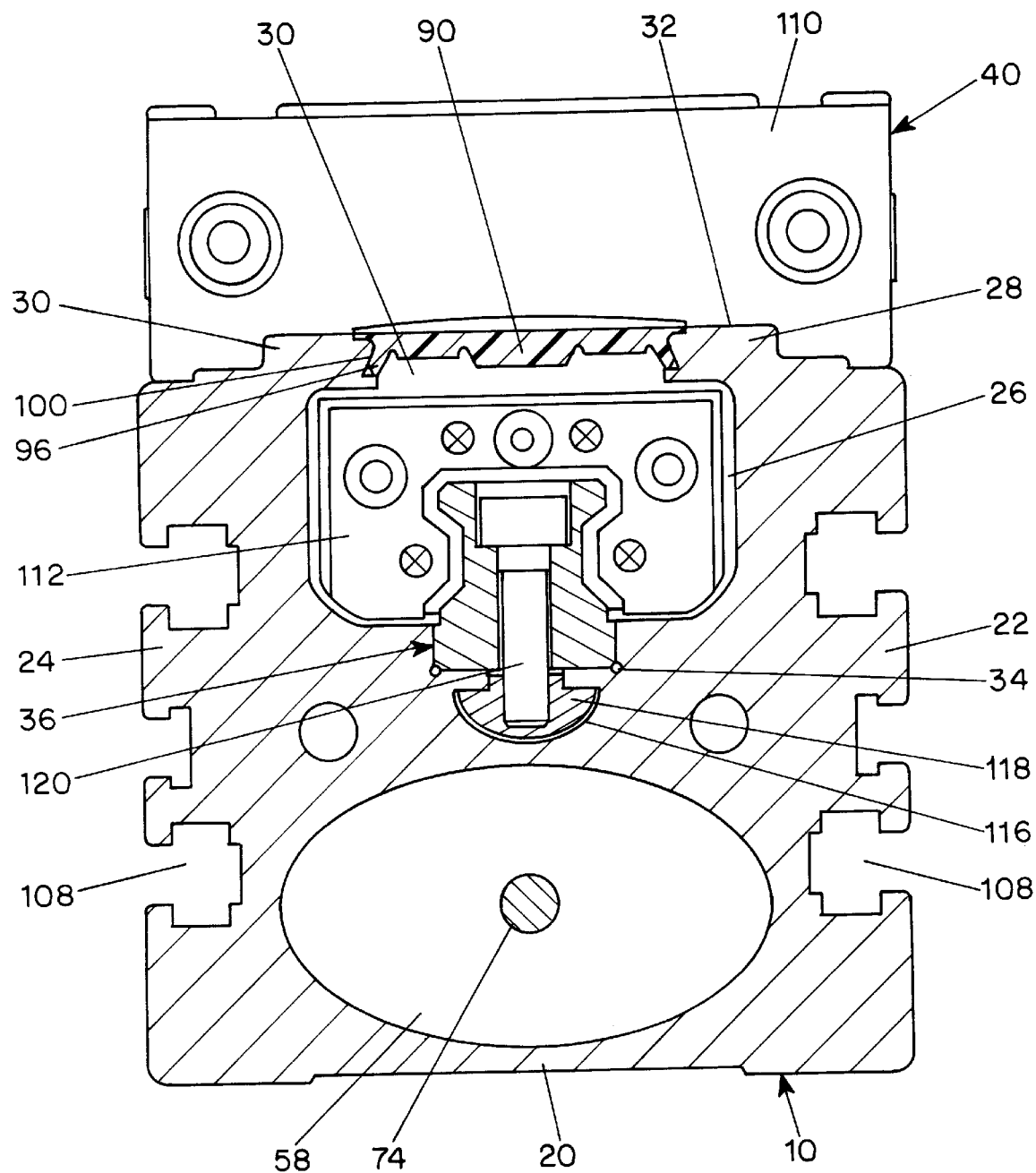
FIG. 3b a cross-sectional view according to line IIIb—IIIb of FIG. 2.

In FIGS. 2 and 3a, 3b one can recognize that the guide housing 10 has a bottom wall 20 and two side walls 22 and 24. By the walls 20, 22 and 24 a guiding cavity 26 is confined. The guiding cavity 26 is upwardly open in the area of an upper confining wall 32 which is composed by two flanges 28 and 30 of the side walls 22 and 24. The opening has the shape of a longitudinal opening 31 which extends through substantially the entire length of the guide housing 10 between the two terminal boxes 16 and 18. In the bottom wall 20 there is provided a positioning groove 34 which is open towards the guiding cavity 26. In this positioning groove 34 the foot portion of a guide rail 36 is inserted. The foot portion is designated by 38. A carriage 40 is guided on the guide rail 36 along the longitudinal direction A of the guide housing 10. The carriage 40 is composed from a U-shaped lower portion 42 and a table portion 44 which are interconnected by a connecting portion 46. The connecting portion 46 passes through the longitudinal opening 31. The three portions of the carriage 40, i.e. the portions 42, 44 and 46, are integrally shaped. An object can be mounted on the carriage and more particularly on the table portion 44. This object can e.g. be attached by groove engagement members which can be inserted into grooves 48 of the table portion 44. These groove engagement members can be provided with threaded bores (not shown) for receiving fastening bolts.

The U-shaped lower portion 42 of the carriage 40 is guided on the guide rail 36 by four ball loops 50. The ball loops 50 are mutually identic. A ball loop consists of a loaded ball series 52, a returning ball series 54 and two arc-shaped ball series (not shown) at the ends of the linear ball series 52 and 54. Thus, the carriage 40 is rollingly guided on the guide rail 36. For moving the carriage 40 along the guide rail 36 in the direction of the longitudinal axis A a pneumatic linear drive unit 56 is provided. This pneumatic linear drive unit comprises an elliptical cylinder space 58 which extends through the total length of the guide housing 10. The longer axis of the elliptical cross-section is parallel with respect to the bottom wall 20 so that for a predetermined total cross-sectional area of the cylinder space, the height of the total arrangement according to FIG. 3a is relatively small. A piston 60 is accommodated within the cylinder space 58. This piston 60 is a piston without piston rod. The piston can be provided in a conventional way with piston rings which are accommodated within circumferential grooves of the piston, such as to sealingly separate two working chambers from each other, working chambers which are provided on both sides of the piston 60. Only the working chamber 62 is shown in FIG. 2. The working chambers are connected to a pressurized air circuitry system through a valve control unit with a source of pressurized air and with atmosphere. The pressurized air circuitry system is illustrated by only one conduit 64. the piston can be moved toward various positions along the cylinder cavity 58 by admitting pressurized fluid into and removing pressurized fluid from the working chambers.

The cylinder cavity is closed at its terminal areas by terminal walls 66. One of these terminal walls is shown in FIG. 2 and designated by 66. This terminal wall 66 is axially fixed by two securing rings 68. The terminal wall 66 can be sealed with respect to the internal circumferential face of the cylinder cavity by sealing means 67. The terminal wall 66 is provided with a passage 70 for a flexible pulling member 74 as shown in FIG. 2. The flexible pulling member 74 is by its one end next to the left side of the piston 60 connected to the piston at a connection point 76. The flexible pulling member 74 runs after having passed the passage 70 around a deviating roller 78 and—from said deviating roller 78—into the guiding cavity 26. The other end of the pulling member 74 is fastened at fastening location 80 to the carriage 40. An analogous pulling member (not shown in FIG. 2) runs from the right-hand side of the piston 60 to the right-hand end of the cylinder cavity, through a passage of a further terminal wall provided at said right-hand end of the cylinder cavity, around a further deviation roller and finally to a fastening position 82 at the right-hand end of the carriage 40. The passage 70 is provided with sealing means 72.

One can easily understand that a movement of the piston 60 resulting from varying air pressure impingement on the working chambers effects a movement of the carriage 40 along the axis A in opposite directions.

The deviating roller 78 is mounted on a bearing block 83. This bearing block is located at the left-hand end of the guide housing 10, as can be seen from FIG. 2. This bearing block 83 is centered by engagement into the cylinder space 58. The deviating roller 78 is slidably mounted on the bearing block 83 by a sliding body 84. This sliding body 84 is adjustable in longitudinal direction by an adjusting screw 86. By turning the adjustment screw 86 the tension of the pulling member 74 can be adjusted. The bearing block 83 and the deviating roller 78 are encapsulated by the terminal box 16. The terminal box 16 is centered on the guide housing 10 by fitting pins 88 and is further secured by screw bolts not shown.

The bearing block 83 can be fastened to the guide housing 10 as a part separate from the terminal box 16. The bearing block 83 is fastened to the guide housing 10 after the piston 60 has been inserted into the cylinder cavity 58, the terminal wall 66 has been mounted within the cylinder cavity 58 and secured therein and the pulling member has been passed through the terminal wall 66. Then, the pulling member 74 can be applied to the deviating roller 78 and can be fastened at location 80 to the carriage 40. The same sequence of steps can be repeated on the right-hand side of the guide housing according to FIG. 2. Finally, the terminal boxes 16 and 18 can be affixed to the guide housing. Such, the positioning of the pulling members 74 is considerably facilitated.

Now the problem comes up to close the longitudinal opening 31 in order to prevent access of dust and swarf toward the guiding cavity 26. In order to solve this problem a stationary covering belt or covering tape is used which can be seen from FIGS. 1, 2, 3a and 3b and is designated by 90. This covering belt 90 is fixed to both terminal boxes 16 and 18, as can be seen from FIG. 2, e.g. by fixation screws 92. The covering belt runs through a passage 94 of the carriage 40, as can be seen from FIGS. 2 and 3a. The covering belt 90 is engaged by its edge zones 96 with edge profiles 100 of the flanges 28, 30 so that the longitudinal opening 31 is—outside the carriage 40—sealingly covered by the covering belt 90. In the longitudinal range of the carriage 40 the longitudinal opening 31 is covered by the carriage itself. At the locations where the covering belt 80 comes out from the passage 94 there is also warranted a good covering effect. This covering effect is obtained by sliding blocks 98 at both ends of the passage 94. These sliding blocks 98 effect an engagement of the covering belt 90 with the edge profiles 100 of the flanges 28 and 30 in close relationship to the terminal faces of the carriage 40. Inside the carriage 40 the passage 94 has an upwardly convex section 102. Thus, the passage 94 can be made broad enough for permitting the use of a cover belt 90 completely covering the longitudinal opening 31. The convex section 102 of the passage 94 is stabilized by a sliding block 104.

One can recognize that all components of the guiding means for the carriage and all components of the driving means for the carriage are encapsulated by the covering belt 90 such that they are not exposed to dirt coming from the surroundings. More particularly, no dirt can come to the pulling members 74. Thus, the sealing means 72 can be used for a long time.

The terminal boxes 16 and 18 are provided with tool access openings 106. A tensioning tool can be introduced through these tool access openings 106 towards the respective adjustment screw 86 for tensioning the pulling member 74. The guide housing 10 with the cylinder cavity 58 and the longitudinal grooves 108 is an aluminium-extruded profile. The grooves 108 are provided for the insertion of groove engagement members so that the guide housing can be fixed to a carrier construction in a great number of positions. It is further to be noted that three side faces of the guide housing 10 are available for being attached to a carrier construction.

The carriage can also be made of light metal. It can be shaped as an extruded profile. In this case it is only necessary to provide the passage 94 after the extrusion by machining. It is also possible to provide the passage 94 as an overdimensioned passage and obtain the final shape of the passage by inserting sliding blocks 98 and 104 which can be preassembled with cover plates 110.

In FIG. 3b one can recognize a head piece 112 at an end face of the U-shaped lower portion of the carriage. This head piece 112 can accommodate arc-shaped ball series (not shown). When the U-shaped lower portion 42 of the carriage is made from aluminium metal, the roller tracks for the balls can be provided on insert plates 114 which may be made from steel and may be swingingly mounted on the U-shaped lower portion 42 of the carriage 40. The guide rail 36 can be fastened to the bottom wall 20 as follows: A counterstrip 118 is inserted into a fixation channel of the bottom wall 20. This counterstrip 118 is made from the same material as the guide rail 36, e.g. from steel. The guide rail 36 is hereupon screw-connected with the counterstrip 118 by screw bolts 120, which screw bolts are passed through a slot extending between the guiding cavity 26 and the fixation channel 116.

In the embodiments of FIGS. 2 to 3b the pulling member 74 can be a monofilament of plastics material or a multi-fibre rope. The cover belt 90 can also be made of plastics material.

Figure 4A:
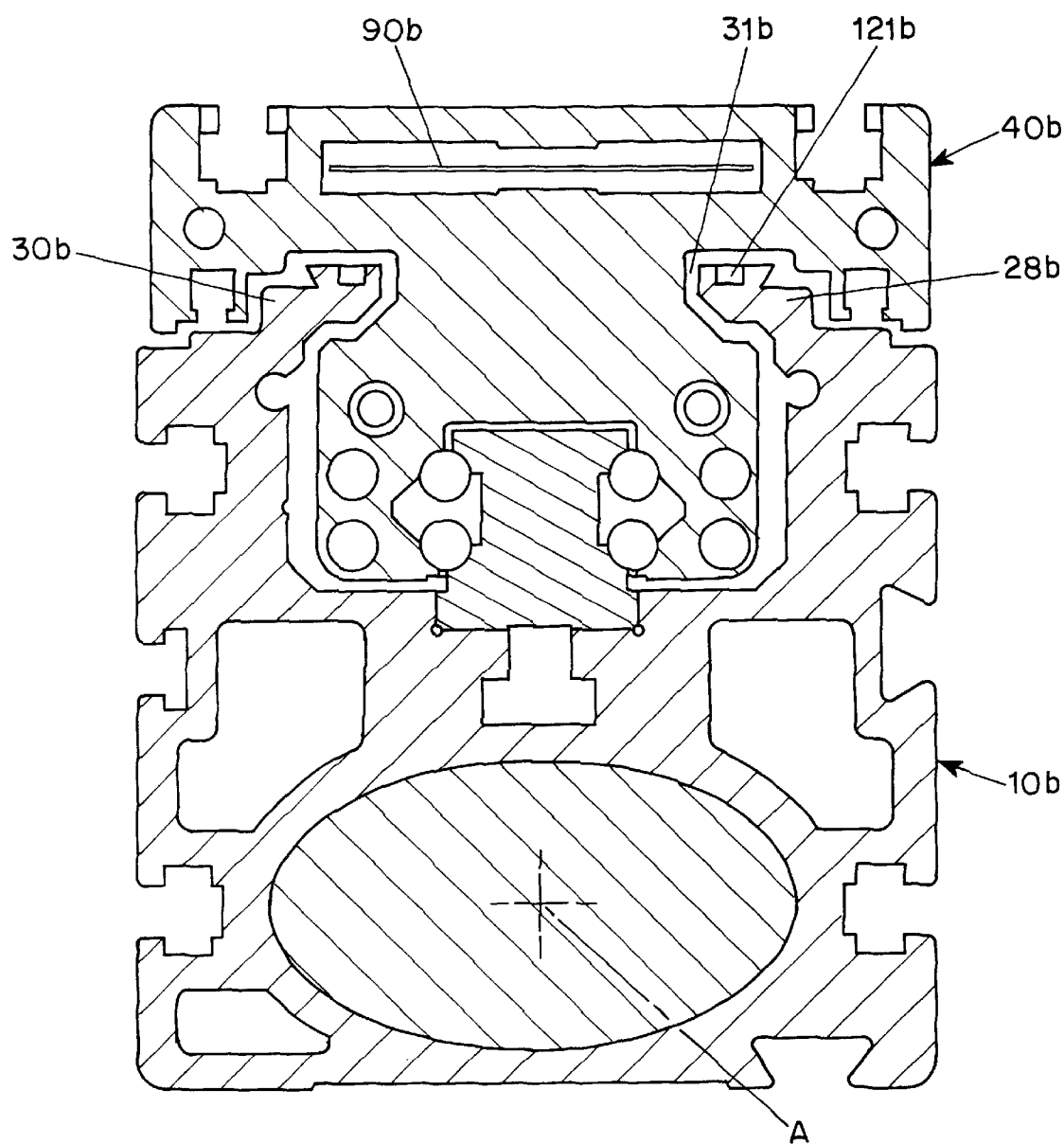
FIGS. 4a and 4b cross-sectional views corresponding to those of FIGS. 3a and 3b according to a first modification of the design according to FIG. 2.
Figure 4B:
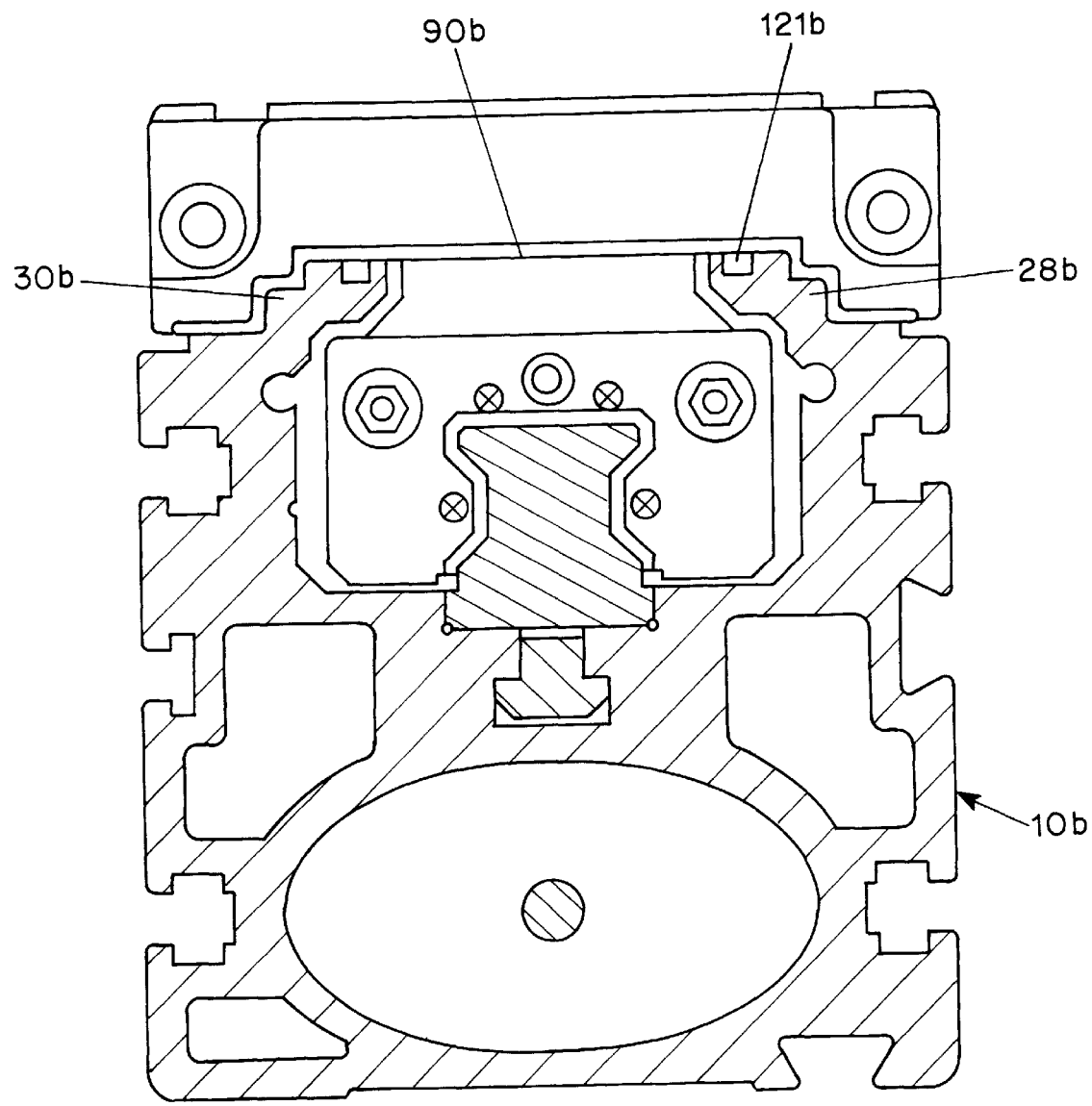
Figure 5A:
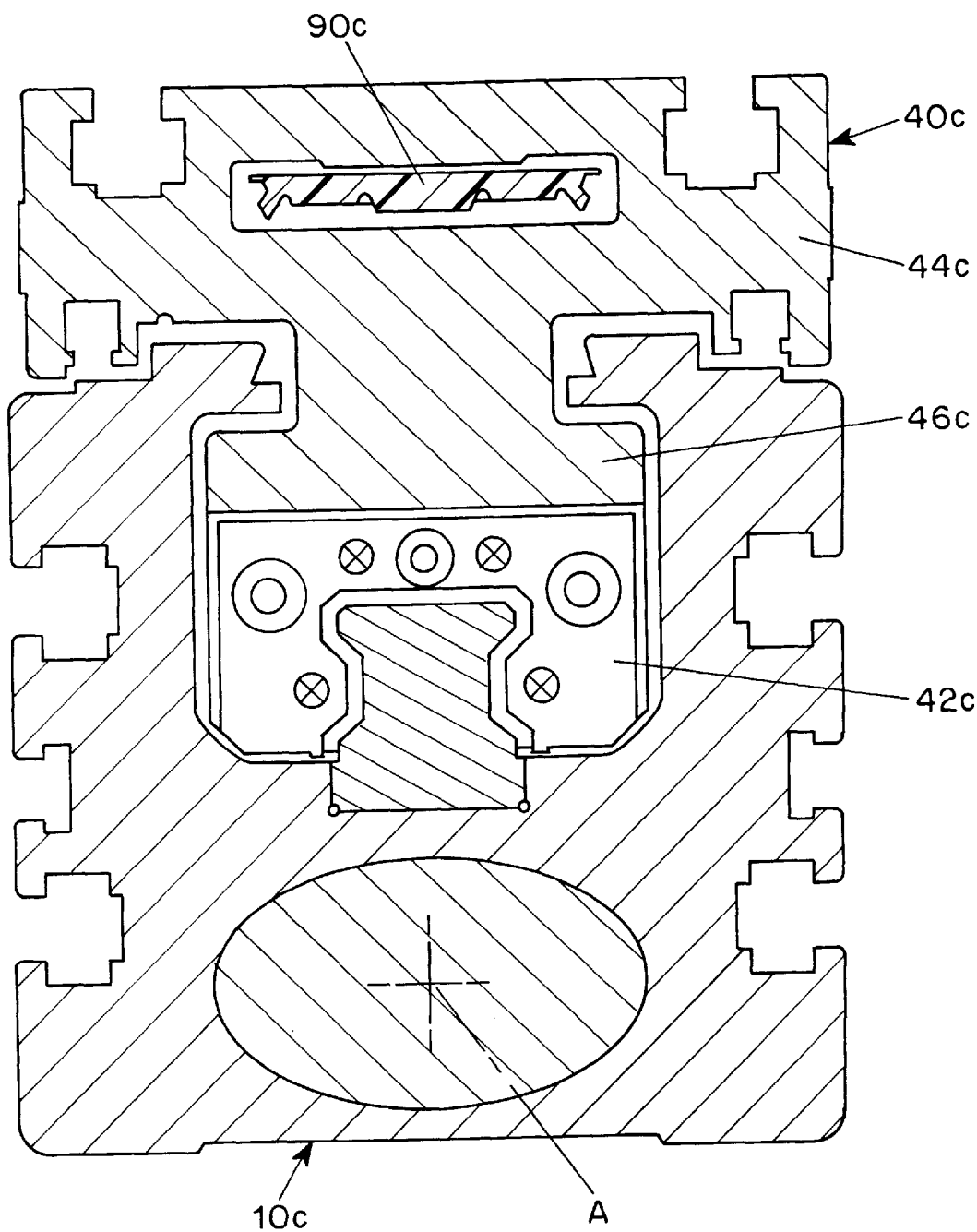
FIGS. 5a and 5b cross-sectional views corresponding to those of FIGS. 3a and 3b with a second modification of the design according FIG. 2.
Figure 5B:
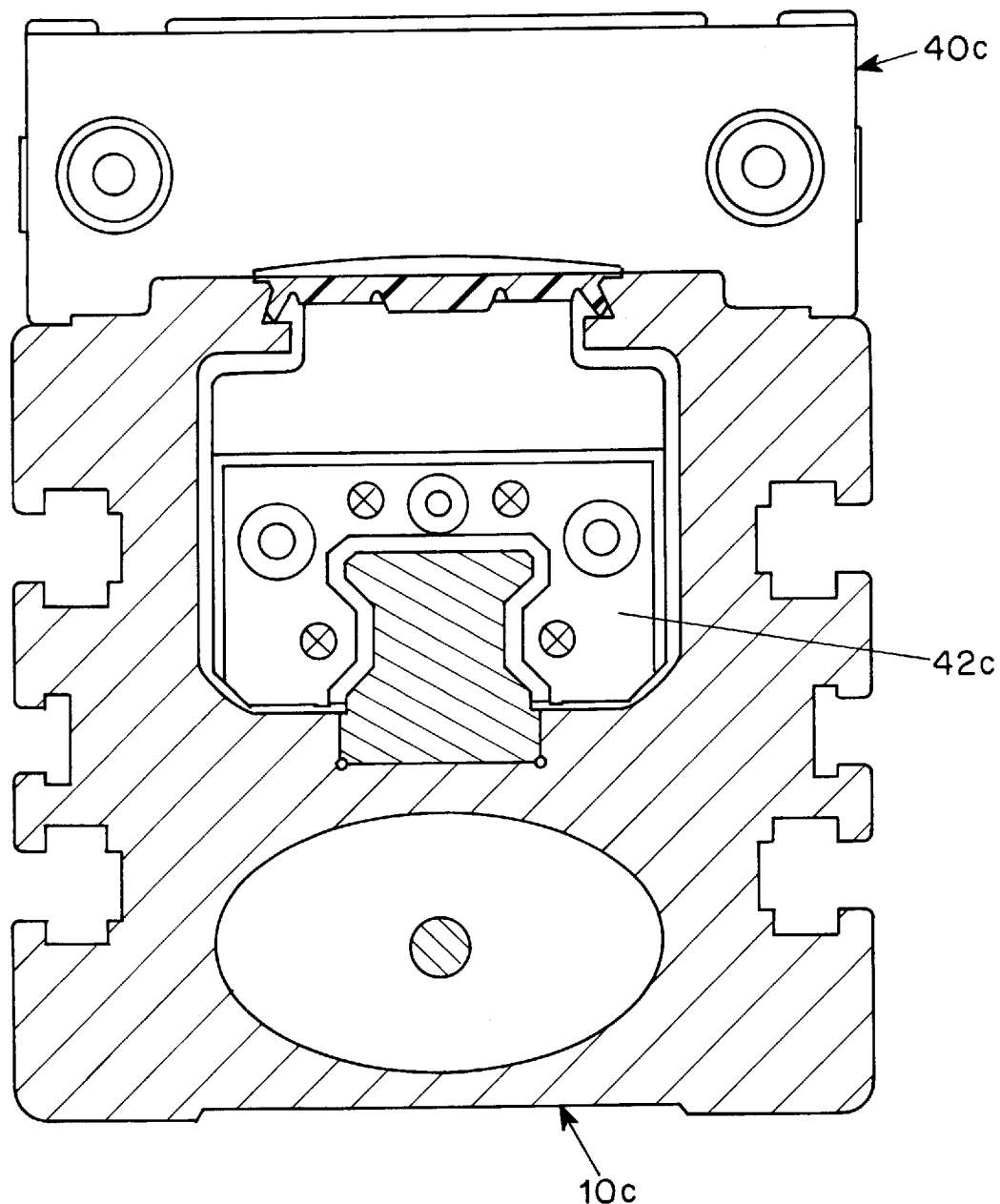

The embodiment of FIGS. 4a and 4b differs from the embodiment of FIGS. 3a and 3b essentially only in that the cover belt 90b is a belt containing a ferromagnetic metal. E.g. a plastic belt is filled with a ferromagnetic powder. Thus, the belt can be maintained in covering engagement with the flanges 28b and 30b by magnetic strips 121b. The embodiment of FIGS. 5a and 5b is different from the embodiment of FIGS. 3a and 3b in so far as the carriage 40c is composed of two separately prefabricated portions, namely a U-shaped lower portion 42 and a table portion 44c which integrally includes also the connecting portion 46c. The advantage of this embodiment is that standard guide runner members can be used as lower portions 42c.

Figure 6A:
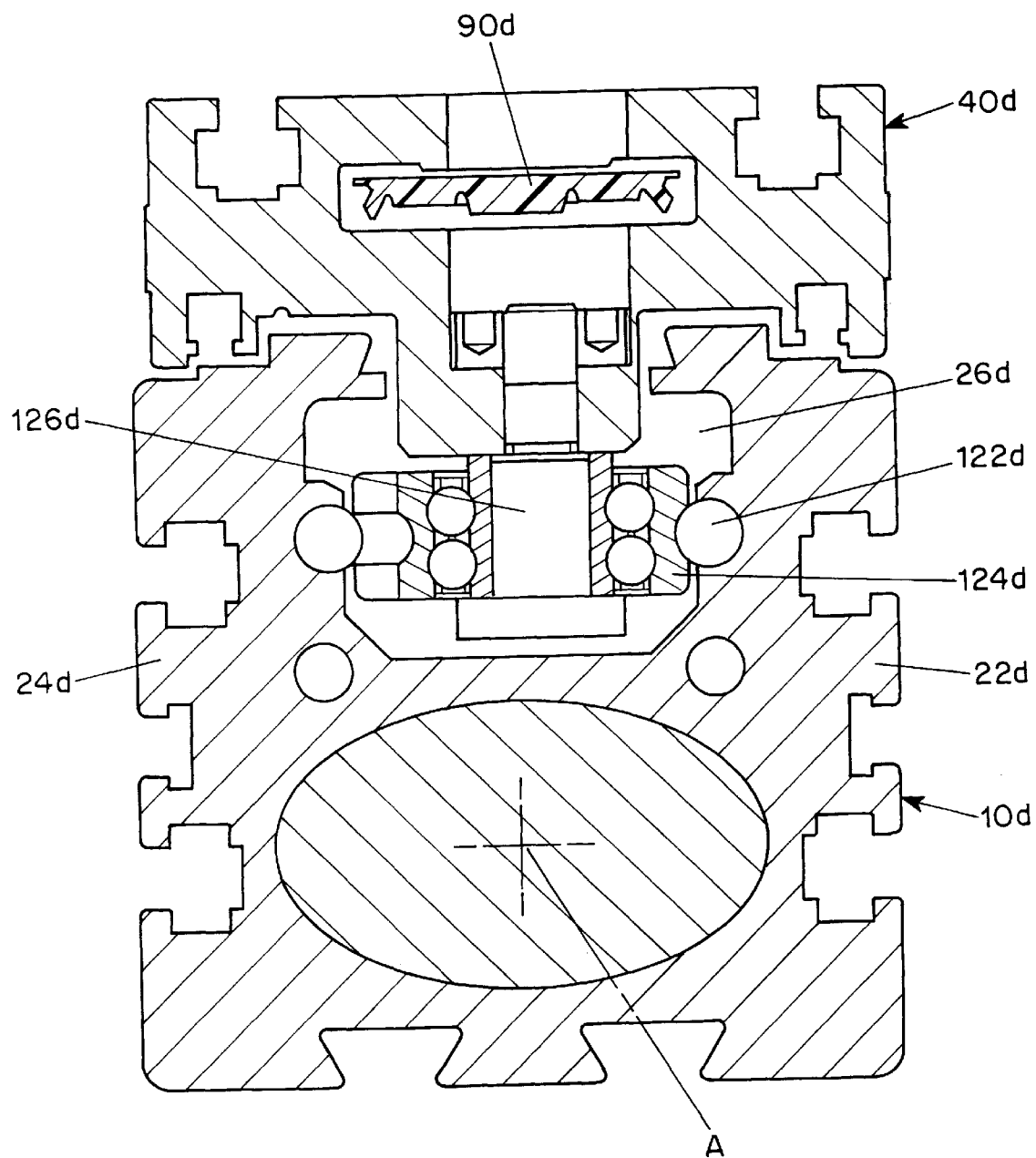
FIGS. 6a and 6b cross-sectional views corresponding to those of FIGS. 3a and 3b with a third modification of the design according to FIG. 2.
Figure 6B:
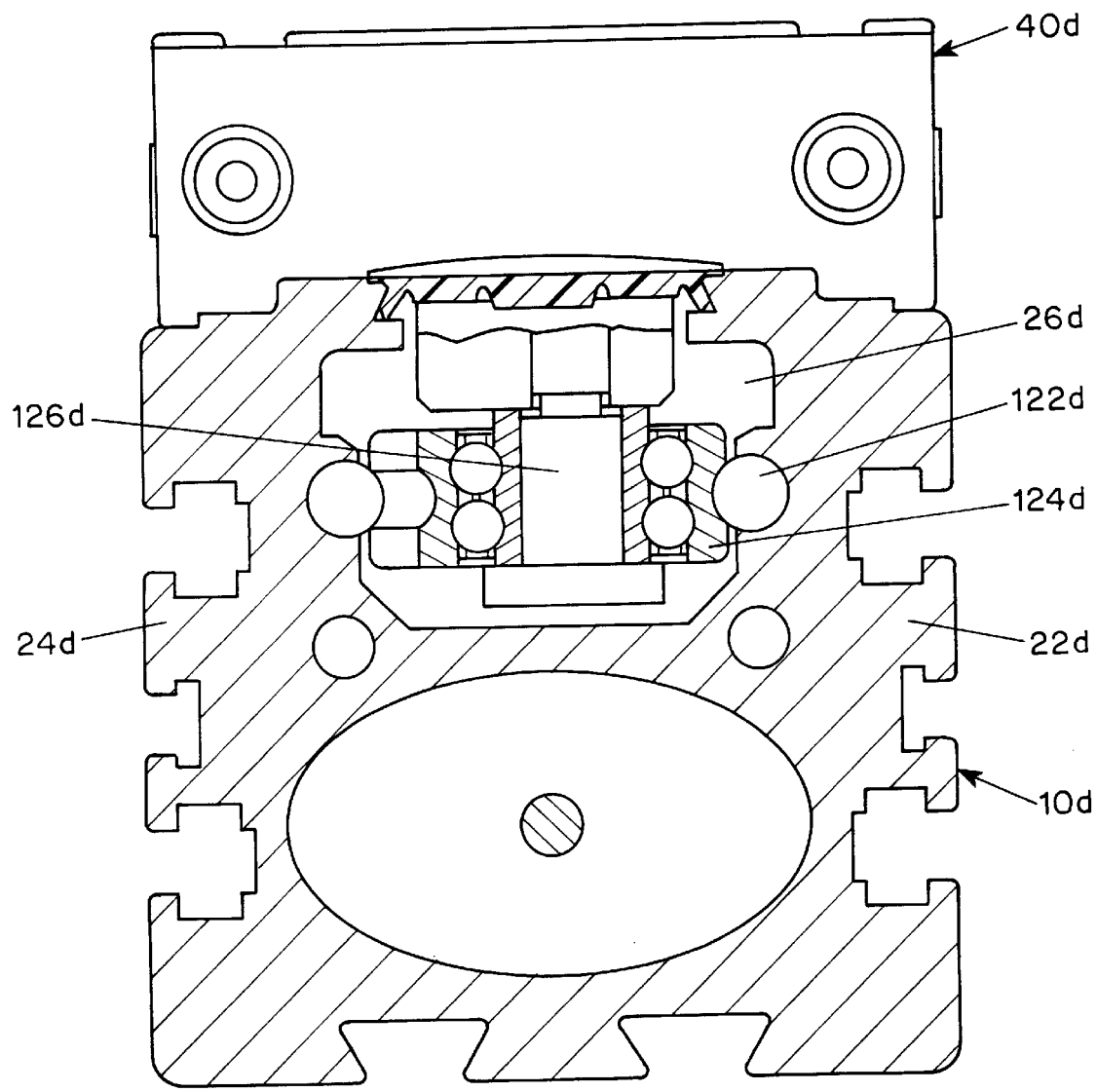

The embodiment of FIGS. 6a and 6b differs from the embodiment of FIGS. 3a and 3b in that the guide rail 36 of FIGS. 3a and 3b has been replaced by two guiding wires 122d which are mounted in the side walls 22d, 24d by clamping. The carriage 40d is guided on these guide wires 122d by rollers 124d. These rollers are rotatably mounted on shafts 126d of the carriage 40d. Rollers 124d following each other in longitudinal direction are intermittently engaged with the left-hand and with the right-hand guide wire 122d.

Figure 7A:
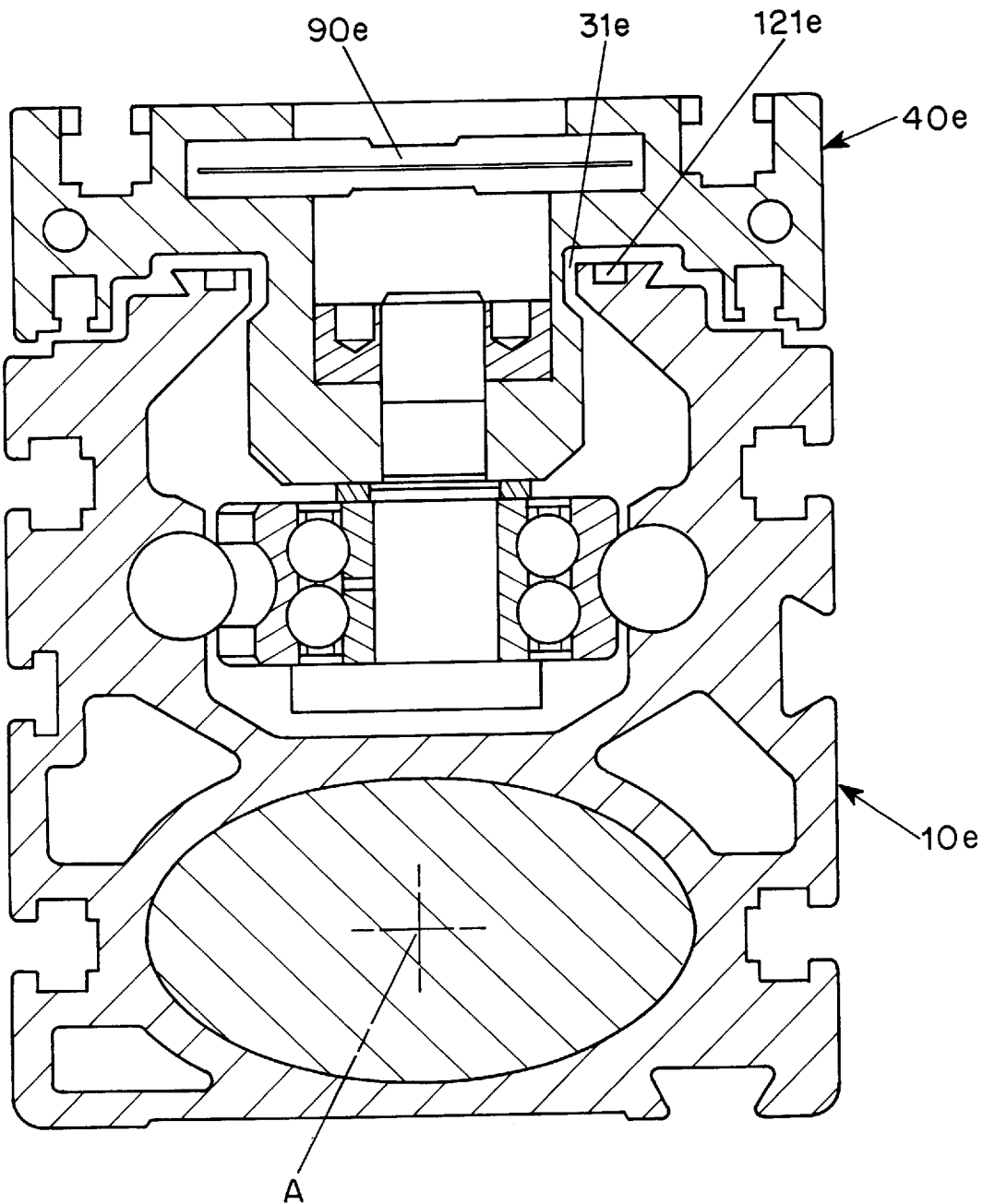
FIGS. 7a and 7b cross-sectional views corresponding to those of FIGS. 3a and 3b with a fourth modification of the design according to FIG. 2.
Figure 7B:
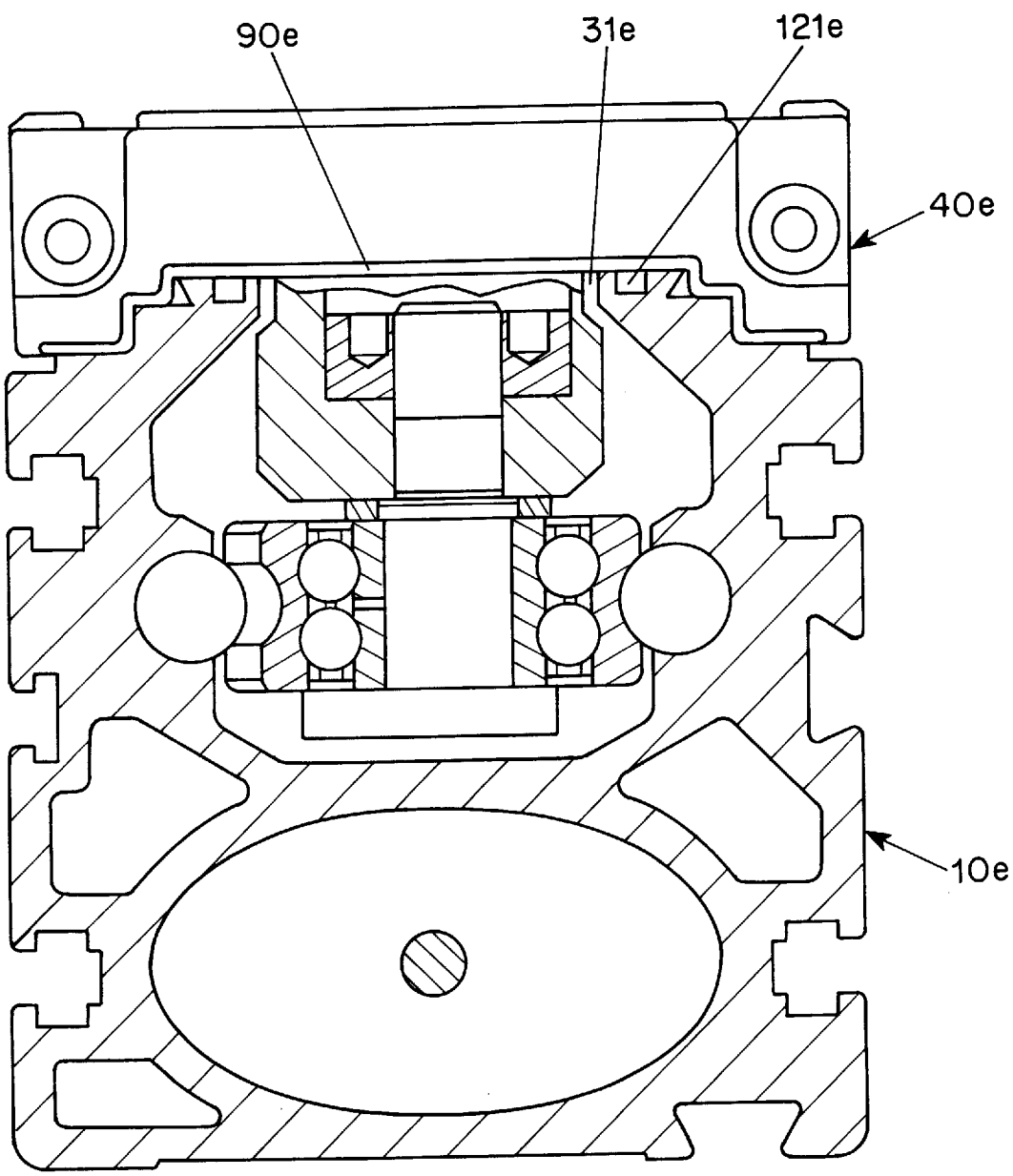

The embodiment of FIGS. 7a and 7b differs from the embodiment of FIGS. 6a and 6b only in that the covering belt made of plastics material has been replaced by a covering belt 90e made of metal. This metallic covering belt can be maintained in sealing position by magnetic strips 121e, as in FIGS. 4a and 4b.

Figure 8:
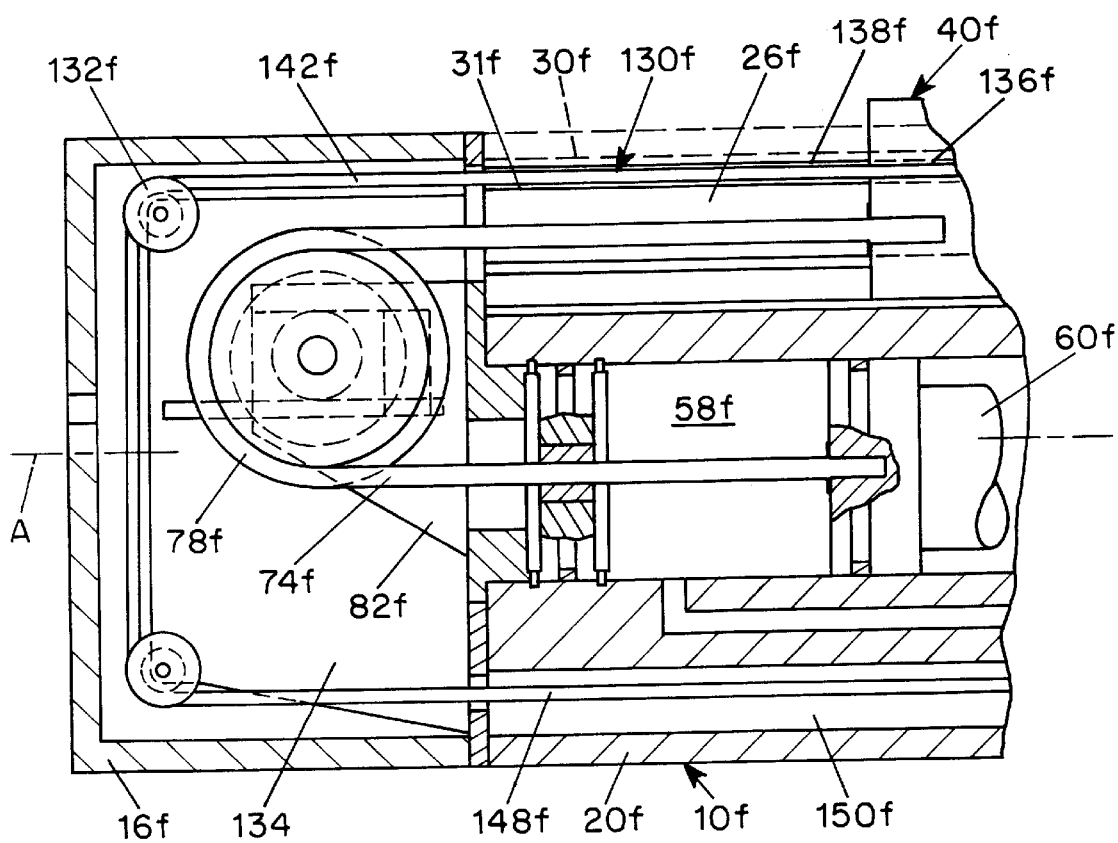
FIG. 8 a longitudinal section corresponding to said of FIG. 2 with a fifth modification of the design according to FIG. 2.

The embodiment of FIG. 8 differs from the embodiment of FIG. 2 in that the stationary covering belt 90 has been replaced by a moving covering belt 130*f* which is moved together with the carriage 40*f*. This movable belt 130*f* comprises a covering portion 142*f* and a return portion 148*f*. The covering belt 130*f* runs at the left-hand end of the guide housing 10*f* around deviation rollers 132*f* which are rotatably mounted on a deviation roller carrier 134*f*. The deviation roller carrier 134*f* is manufactured separately from the bearing block 82*f* so that it can be separately mounted on the guide housing 10*f*. This results in further facilitating the assembling. The assembling can be made e.g. as follows: after mounting the bearing block 82*f* on the guide housing 10*f* and after applying the pulling member 74*f* to the deviation roll 78*f*, the deviation roller carrier 134*f* is fastened to the guide housing 10*f*. Hereupon the covering belt 130*f* is applied and finally the terminal boxes 16*f* and 18*f* are fastened to the guide housing 10*f*. Thus, it is possible to provide separate tensioning means also for the deviation rollers 132*f* which can be activated through the terminal boxes 16*f* and 18*f* by tensioning tools. Further, one can recognize in FIG. 8 that the returning portion 148*f* of the covering belt runs through a covering belt return channel 150*f* of the bottom wall 20*f*.

In this embodiment it is not necessary to guide the covering belt 130*f* through the carriage 40*f*. The covering belt is rather fixed with both ends to axially opposite terminal faces of the carriage 40*f*, as indicated at 136*f*. Thus, the carriage 40*f* has a simplified shape as compared with the before-described embodiments. The edges of the covering belt 130*f* can be guided by guide grooves 138*f* of the flanges 28*f*, 30*f* of the guide housing 10*f*. Thus, labyrinth-type sealing means are obtained.

Figure 9:
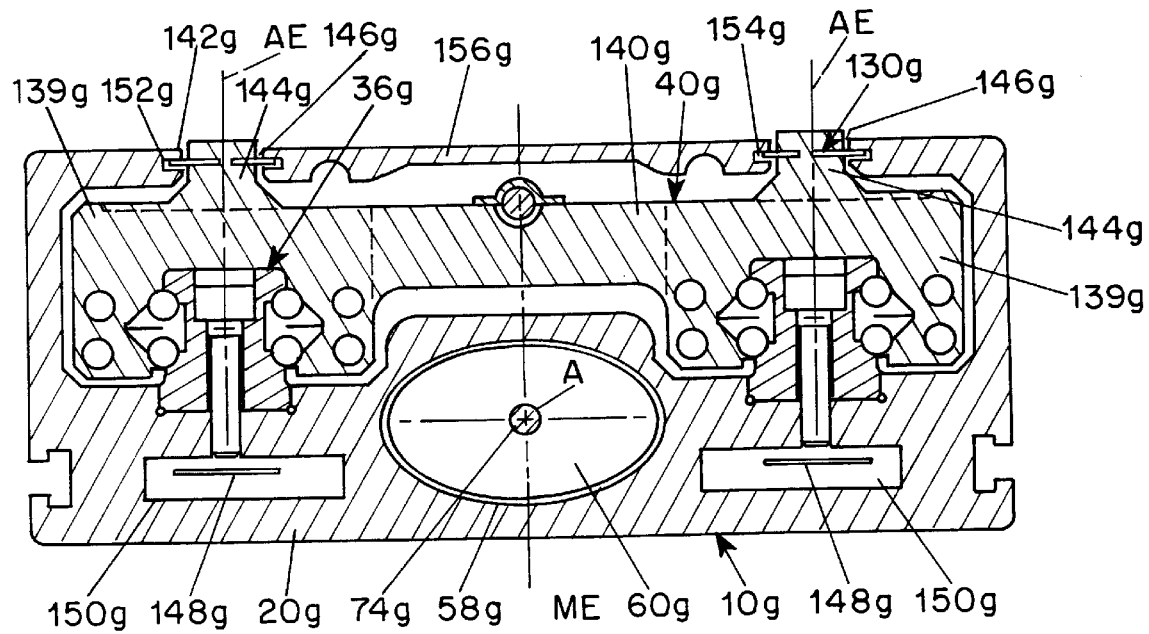
FIG. 9 a cross-sectional view of a further embodiment of the linear guiding unit.

In the embodiment of FIG. 9 the carriage 40*g* comprises two U-shaped runner members 139*g* which are integrally interconnected by a cross piece 140*g*. The U-shaped runner members 139*g* are guided on guide rails 36*g* such as in FIG. 3*a* and 3*b* the lower portion 42 is guided on the guide rail 36. The cylinder cavity 58*g* and the piston 60*g* are arranged together with the pulling member 74*g* in a common middle plane ME. On the other hand, the guide rails 36*g* are arranged together with the U-shaped runner members 139*g* and the covering belt 130*g* in external planes AE. The covering portions 142*g* of the covering belts 130*g* are connected with connecting members 144*g* which are mounted on the U-shaped runner members 139*g* as integral parts thereof or as separate parts. These connecting members 144*g* extend through the longitudinal openings 146*g* so that an object can be mounted at the upper end faces of the connecting members 144*g*. The covering belts 130*g* are deviated at the terminal portions of the guide housing 10*g* by deviation means similar to the deviation means shown in FIG. 8. These deviation means can again be separately mounted. The return portions 148*g* of the covering belts 130*g* run through separate return channels 150*g* of the bottom wall 20*g*. The covering portions 142*g* of the covering belts 130*g* engage with respective edges in slots 152*g* and into slots 154*g* of a covering plate 156*g*. The covering plate 156*g* extends throughout the length of the guide housing 10*g* and can be fastened at the end of the guide housing 10*g* with tension such that even with housings of great length no sagging effect is to be expected. The cover plate 156*g* can also be fixed to cross pieces at the ends of the guide housing, which cross pieces are not shown. These cross pieces can replace the terminal boxes 16*f* and 18*f* of FIG. 8 and can take care of the encapsulation of the deviation means for the pulling members 74*g* and the covering belts 130*g* which are also necessary in FIG. 9. Thus, one can see that there is again a separate manufacturing and assembling of the deviation means and the cross pieces.

In all embodiments the cylinder cavity is circumferentially closed. In so far all embodiments are different from such linear guiding units with pneumatic drive means in which the piston is connected with the carriage through a slot of the cylinder cavity. The embodiments of this invention are preferably provided with circumferentially closed cylinder cavities and with pulling members axially extending through end walls of the cylinder cavity. Embodiments with slotted cylinder cavities are, however, not excluded at least for special cases.

The pneumatic drive means which have been shown before require a hermetic sealing of the cylinder cavities at the passages of the pulling members through the terminal walls of the cylinder cavity. It is to be noted, however, that these sealing means are not always perfect. For obtaining exact positions of the carriage it is therefore recommended to provide control loops: The respective position of the carriage is watched by position sensor means. The actual position is hereupon compared with a predetermined aim position. The difference between the actual position and the aim position is used as a control signal for the valve control of the pneumatic drive means.

The before-described embodiments show only pneumatic drive means. It is, however, possible that the pressurized gas is replaced by a liquid.

The embodiments with monopiece carriage have the advantage that the dimensions can be reduced as a result of avoiding interconnecting means between various carriage components.

Returning once more to the embodiments with stationary covering belts it should be noted that the edges of the stationary covering belts can be snapped into edge profile of slot-confining members. This possibility is less desirable, when the covering belts are driven together with the table because the friction between the covering belts and the edge profiles of the longitudinal openings could be too large.

When using the term "fluid" in the specification liquid and gases and especially air are possible.

Figure 10:
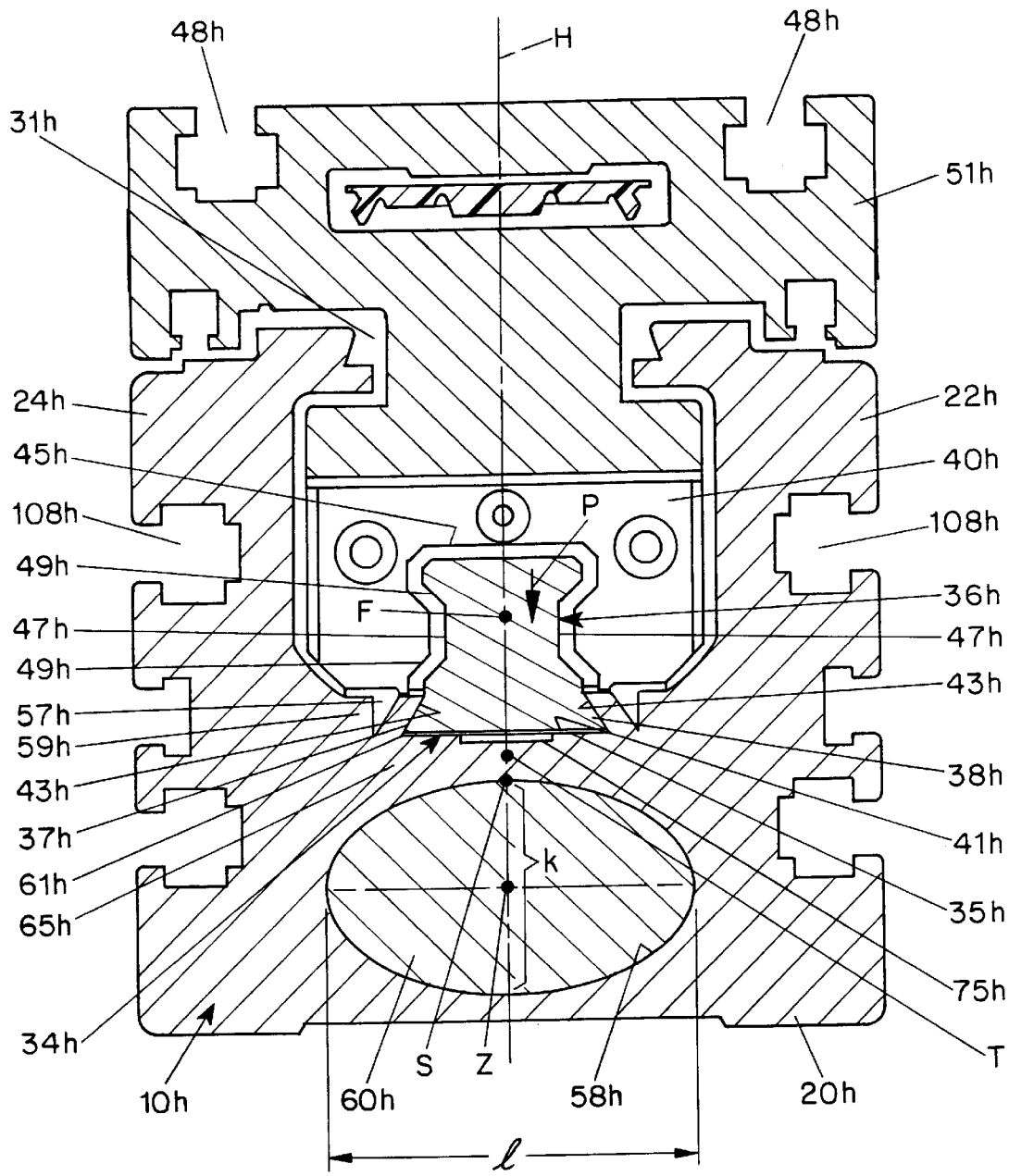
FIG. 10 a cross-sectional view of a guide rail unit.

In FIG. 10 the guide housing is designated by 10*h*. This guide housing 10*h* is e.g. an extruded profile made of light metal. The guide housing 10*h* comprises a bottom wall 20*h* and side walls 22*h*, 24*h*. The guide housing 10*h* is upwardly open and comprises a longitudinal opening 31*h*. The side walls 22*h* and 24*h* are provided with T-grooves 108*h*. The guide housing 10*h* can be fastened by these T-grooves 108*h* to a carrier construction. The bottom wall 20*h* is provided with a positioning groove 34*h* for positioning a guide rail 36*h*. The positioning groove 34*h* is confined by foot portion application faces 35*h* and side face application faces 37*h*. The guide rail 36*h* comprises a foot portion 38*h* with a foot portion standing face 41*h* and foot portion side faces 43*h*.

Moreover, the guide rail 36*h* has a head portion 45*h* and lateral areas 47*h*, each of them being provided with two guiding tracks 49*h* for a carriage 40*h*. The carriage 40*h* is preferably guided on the guiding tracks 49*h* by endless roller loops and, more particularly, ball loops as described and illustrated in EP 0 340 751 A2. An object carrier 51*h* is mounted on the carriage 40*h* for common movement therewith along the guide rail 36*h*. This object carrier 51*h* is provided with T-grooves 48*h* by which an object can be mounted on the object carrier 51*h*, either immediately or through an object table.

A cylindrical channel 58*h* is provided within the guide housing 10*h*. This cylindrical channel 58*h* has an elliptical cross-sectional area. A short axis k of this cross-sectional area is parallel with respect to the normal axis H of the guide rail 36h and the longer axis I is transverse to the normal axis H. The guide rail 36h is rigidly positioned within the guide housing 10h in that the side face application faces 37h are applied against the foot portion side faces 43h, whereby the foot portion standing faces 41h are simultaneously urged against the foot portion application faces 35h of the guide housing 10h. Thus, the guide rail 36h is also fixed against movement along the longitudinal axis F thereof with respect to the guide housing 10h. The guide housing 10h has a longitudinal axis T and the cylindrical channel 58h has a cylinder axis Z.

For securing the guide rail 36h within the positioning groove 34h the side face application faces 37h are shaped against the foot portion side faces 43h by embossing notches 57h into step areas 59h of the guide housing 10h which step areas 59h laterally confine the positioning groove 34h. The notches 57h may be extended in parallel with the axis T of the guide housing 10h throughout the total length of the guide housing 10h. Alternatively, the notches 57h may be represented by a series of individual notches which are distributed in periodical distances along the axis T. It is assumed now that the side face application faces 37h are substantially parallel with respect to the normal axis H before mounting the guide rail 36h on the guide housing 10h. Such, the guide rail 36h can be inserted along the direction of arrow P into the positioning groove 34h. Hereupon, the side face application faces 37h are shaped against the foot portion side faces 43h by embossing the notches 57h. It should be noted that the depth of the notches 57h substantially corresponds to the height of the side face application faces 37h along the direction of the normal axis H. Such it is warranted that when embossing the notches the contact pressure resulting from the notching and acting between the side face application faces 37h, on the one hand, and the foot portion side faces 43h, on the other hand, extends nearly down to the edges 61h. Thus, an intimate fitting of the guide rail 36h in the positioning groove 34h is obtained. The precise transversal position of the guide rail 36h with respect to the guide housing 10h can be obtained in that the transversal dimension of the rail adjacent the foot portion standing faces 41h corresponds precisely to the transversal dimension of the positioning groove 34h adjacent the foot portion application faces 35h. If such a precise adaptation does not exist, i.e. if the guide rail 36h has a lateral play after having been inserted into the positioning groove 34h, a lateral positioning of the guide rail 36h with respect to the guide housing 10h can also be obtained in that during the deformation of the side face application faces 37h in a respective longitudinal area of the total length of the guide housing 10h, the guide rail 36h is adjusted with respect to the guide housing 10h by adjusting means.

This latter method of adjusting is also applicable when the guide housing 10h such as supplied by the manufacturer has no precise linear form with respect to the side face application faces 37h, so hat the side face application face 37h cannot be utilized for adjusting the guide rail 36h. It is further possible that the guide rail 36h is corrected towards an absolute linearity or straightness with respect to an adjusting ruler provided in a mounting station.

In this case one can provide a highly precise runner movable on the guide rail 36h and this runner is adjusted to a constant lateral distance with respect to the ruler. Each time after a desired lateral distance has been obtained the guide rail 36h is fastened in the positioning groove 34h. In dependence of the relative bending stiffness of the guide rail 36h and the guide housing 10h it is also possible that the guide housing 10h is adjusted with respect to the ruler so that the linearity of the guide rail is also imparted to the guide housing. Possibly one can also renounce the linear adjustment of the guide housing when one must fear that after removing the adjustment means the rebound force of the guide housing could result in a non-linear deformation of the guide rail 36h. In each case the adjusting operation is selected in dependence of the precision of the components 10h and 36h. When it is intended to mount the guide housing 10h without expensive adjusting operation on a superordinated carrier construction it is necessary that the pre-product guide housing 10h and the pre-product guide housing 36h have correspondingly high precision, and one must further take care that when the guide rail 36h is fastened to the guide housing 10h deformations of the guide housing 10h are avoided. The cylindrical channel 58h accommodates a piston 60h. This piston 60h subdivides the cylindrical channel 58h into two working chambers which are connected to a driving fluid circuitry. The piston 60h is connected with a flexible pulling member which runs inside the cylindrical channel 58h toward the ends of the channel and is passed through terminal cover members of the channel. Near an end of the guide housing 10h the pulling member is deviated by deviating rollers and is connected with the object carrier 51h. More details of such a driving system are e.g. illustrated in EP 0 384 032 B1.

One can recognize from FIG. 1 that the separating wall 65h between the foot portion application face 35h and the cross-section of the cylindrical channel 58h has a minimum of wall thickness in the apex area S of the cross-sectional area of the cylindrical channel. The wall thickness is in this location substantially equal to the height of the side face application face 37h as measured along the normal axis H.

It is also possible that the guide housing 10h is prefabricated with side face application faces 37h which are inclined toward each other already before the insertion of the guide rail 36h. In this case the insertion of the guide rail 36h can be performed by sliding the guide rail in axial direction into the positioning groove 34h. The fixation can then again be obtained by embossing grooves on both sides. These grooves can be embossed in this case with a smaller cross-sectional area.

Figure 11:
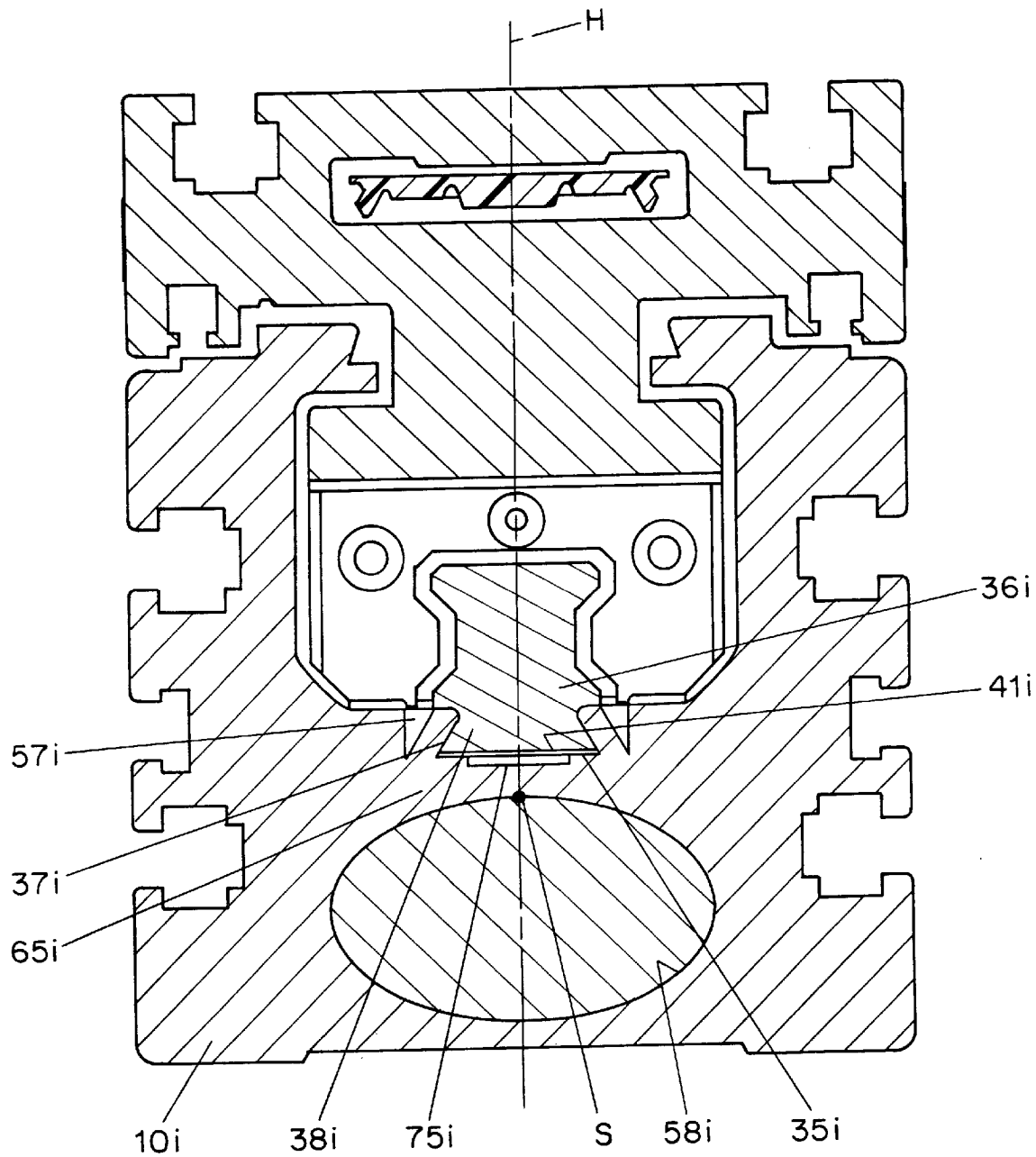
FIG. 11 a cross-sectional view of a modified guide rail unit.

The embodiment of FIG. 11 differs from the embodiment of FIG. 10 only in that the foot portion 38i is smaller in transverse direction. Generally the embodiment of FIG. 10 is preferred because in the embodiment of FIG. 10 the notches 57h are located in areas of increased wall thickness such that the risk of deformation of the cylindrical channel shape is reduced.

In both embodiments one can insert a stiffening member into the channel during the embossing of the notches 57h and 57i, respectively, in using a stiffening member which is in cross-sectional shape adapted to the cross-sectional shape of the channel. Then the risk of deformation of the cylindrical channel is excluded. The stiffening member is required only in the respective longitudinal section of the channel in which notching takes place. If the notches are embossed progressively along the guide housing 10h und 10i, respectively, a relatively short stiffening member can be moved in synchronism with a notching tool.

Figure 12:
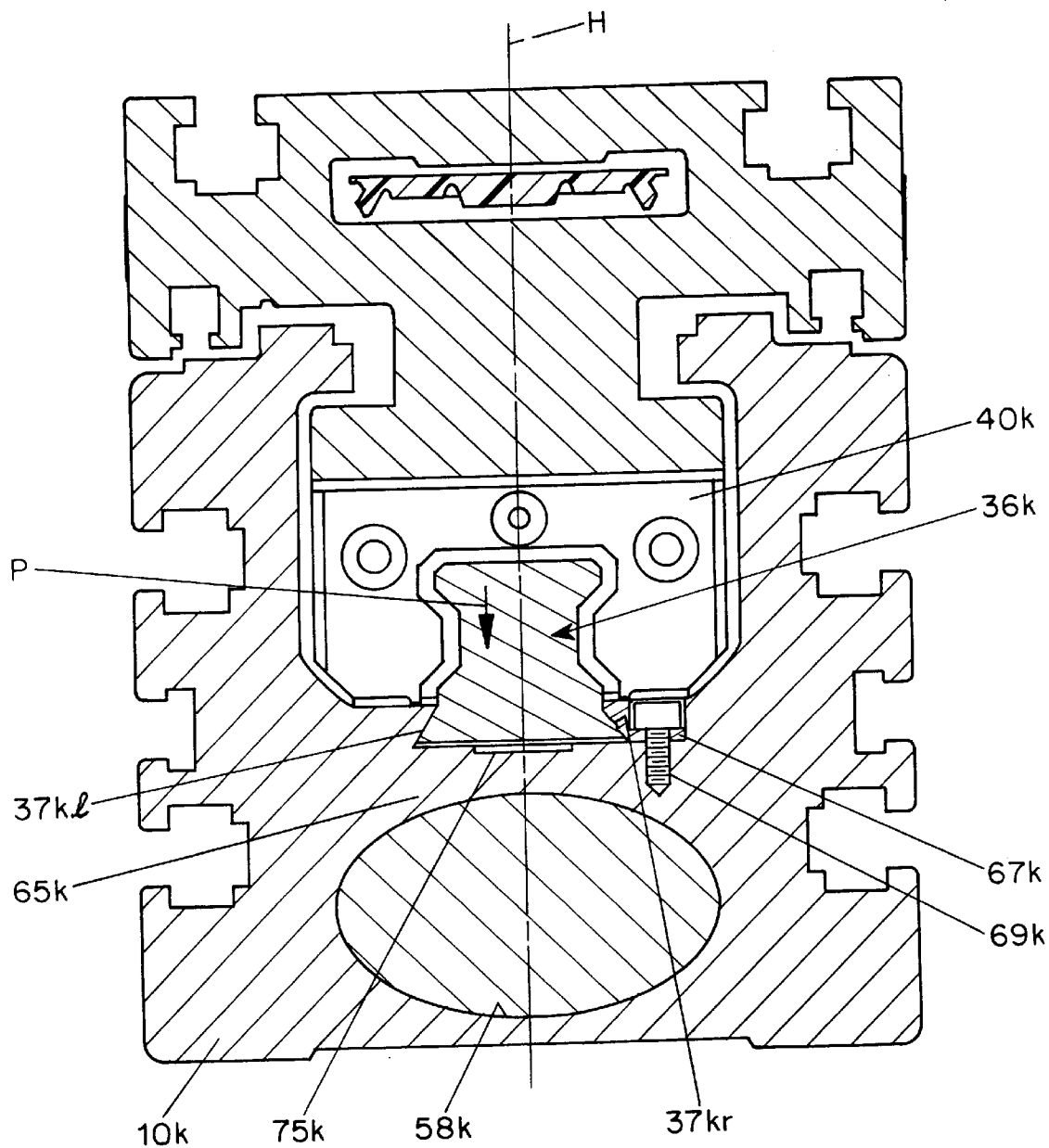
FIG. 12 a cross-sectional view of a further modified guide rail unit.

The embodiment of FIG. 12 differs from the embodiment of FIG. 11 in that the right hand side face application face 37kr is provided on a fastening strip 67k which is screw-connected by screw bolts 69k with the guide housing 10k. With this embodiment the guide housing 10k can be preshaped such that the side face application face 37kl has the inclination as shown already before the guide rail 36k is inserted. Thus, the guide rail 36k can easily be inserted in the direction of the arrow P. Hereupon, the fastening strip 67k can be applied by the screw bolts 69k.

Also in this embodiment essential advantages of the invention are achieved, one should observe that the screw bolts 69k are located in an area of large wall thickness of the separating wall 65k, so that they can be tightened without the risk of deformation of the cylindrical channel and also operational forces can be transmitted without risk of deformation of the separating wall 65k and the channel profile 58k, e.g. when the runner or carrier is subject to forces or torques.

Figure 13:
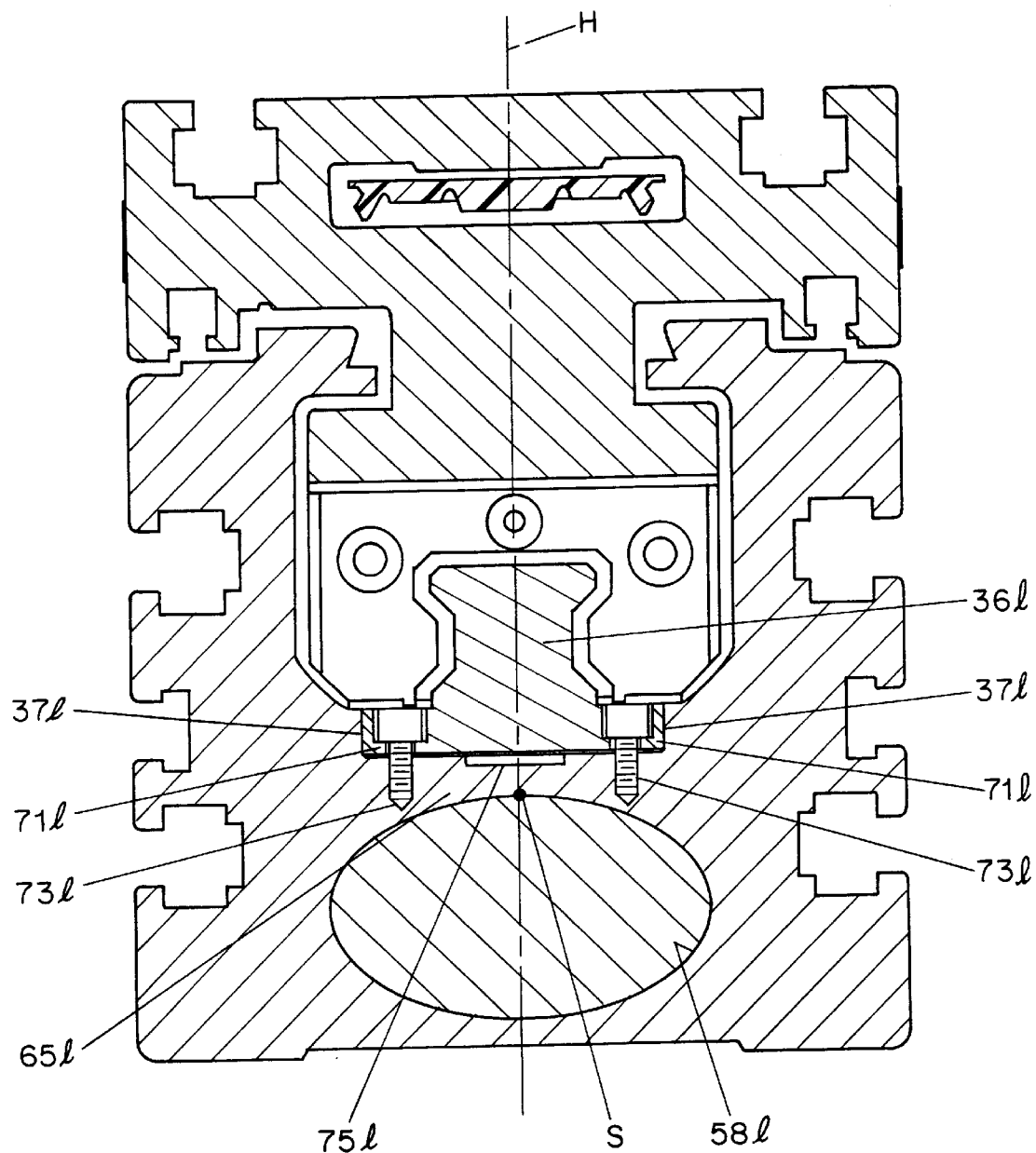
FIG. 13 a cross-sectional view of a further modified guide rail unit.

In the embodiment of FIG. 13 the guide rail 36l is integral with the fastening flange 61l projecting in opposite directions. The side face application faces 37l serve in this embodiment only for laterial positioning. The fastening function is fulfilled by screw bolts 73l which extend through flanges 71l and are screwed into threaded bores of the separating wall 65l. Even in this embodiment an essential advantage ot the invention is achieved because the securing means, e.g. the screwing bolts 73l, are located laterally of the apex S of the cylindrical channel in areas of increased wall thickness of the separating wall 65l.

One can see that the embodiment of FIGS. 10 and 11 are characterized by uncomplicated components and by unvariable positioning of the guide rail with respect to the guide housing 10h and 10i, respectively. Due to the fact that the guide rails 36h and 36i, respectively, contact only outside the normal axis H the foot portion application faces 35h and 35i, respectively, and further due to the fact that the notches 57h and 57i, respectively, are embossed in considerable distance from the normal axis H, the vertical forces applied for shaping the notches 57h and 57i, respectively, cannot result in a deformation of the cylindrical channels 58h and 58i, respectively. Moreover, the guide rail 36h and 36i, respectively, cannot attack the apex area S of the separating wall 65h and 65i, respectively, and cannot thereby cause a deformation of the elliptical cross-section when a vertical force component is transmitted to the guide rail 36h and 36i, respectively, by bending the side face application faces 37h and 37i, respectively, toward the foot portion side faces 43h and 43i, respectively. Also operational forces between the guide rail 36h and 36i can be transmitted to the guide housing 10h and 10i, respectively without the risk of a deformation of the elliptical profile. The rail unit and the linear guiding units equipped therewith can be e.g. used in roboters and machine tools for guiding tools and instruments.

In the embodiment of FIGS. 10 to 13 the recesses which cause support of the guide rail outside of the apex area S are provided in the separating wall 65h to 65l, respectively, and are designated by 75h to 75l, respectively. This is a preferred embodiment because the recesses 75h to 75l, respectively, can be shaped during the extrusion of the guide housing. Alternatively, it is also possible that recesses are provided in the foot portion standing face.

For fastening the guide rail to a guide housing one can also use an adhesive or filler compound. These methods of fastening can also be used if guide rails of any cross-sectional shape are to be fastened to rail carriers as, for example, described in EP 0 340 751 A2. It can, for example, always be used when the height of the total construction is to be reduced.

Figure 14:
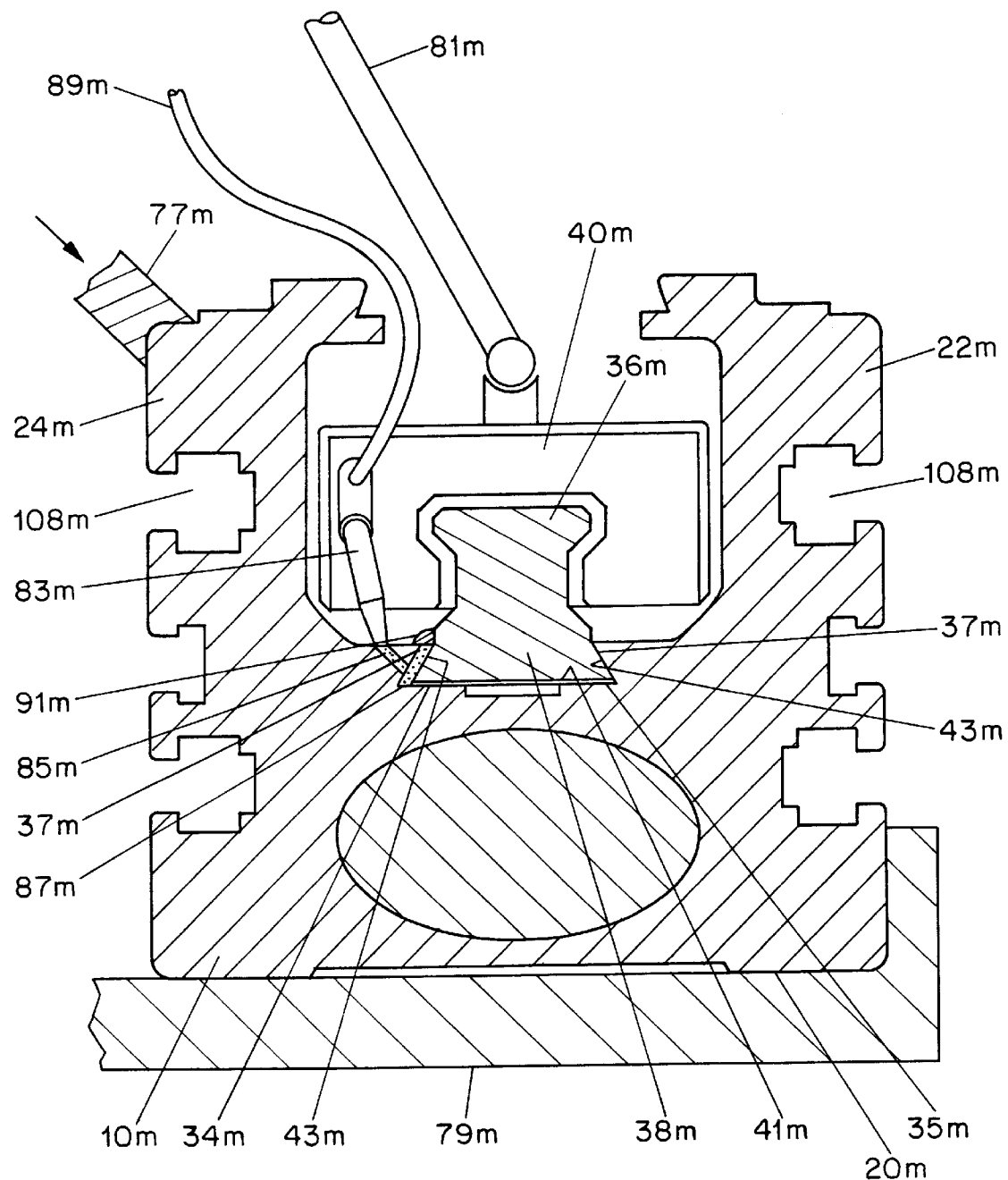
FIG. 14 a cross-sectional view of a further modified guide rail unit during mounting the guide rail into a guide rail housing in using a fixation compound and FIG. 15 a modification of FIG. 14.

In FIG. 14 analogous parts are designated with the same reference numerals as in FIG. 10, the index h being replaced b index m. The carrier, i.e. the guide housing 10m, is pressed bei a pressing device 77m against an adjusting ruler 79m. The guide rail 36m is pressed by a further pressing device 81m into the positioning groove 34m such that it is applied with a right hand foot portion side face 43m toward a right hand side face application face 37m of the positioning groove 34m and by its right hand foot portion standing face 41m toward the right hand foot portion application face 35m. Thereby a gap 87m is obtained on the left hand side of the foot portion. The carriage 40m is used for transmitting the press force because the pressing device 81m acts onto the carriage 40m. Thus, an adjustment can be obtained possibly throughout the total length of the guide rail 36m when the carriage 40m is progressively moved and a fixation compound is always injected at the location of the carriage. The pressing device 81m is moved such as to follow the carriage 40m. Filling channels 85m are provided in the carrier 10m for filling the gap 87m. The axial distance of these channels is selected in response to the width of the gap 87m and the viscosity of the fastening compound in the injection state. The filling device 83m is moved together with the carriage 40m such as to come in alignment with the various filling channels 85m which are distributed along the length of the carrier 10m. Thus, the fastening compound enters into the gap 87m which is confined between the left hand undercut side face application face 37m and the left hand foot portion side face 43m. The filling device 83m is connected through a filling tube 89m with a source of fastening compound. The upper exit of the gap 87m is closed by a sealing bead 91m so that injection can be made under pressure without substantial leakage of the fastening compound. The dose of the fastening compound is controlled in accordance with the cross-sectional area of the gap 87m so that the gap 87m can be completely filled.

Figure 15:
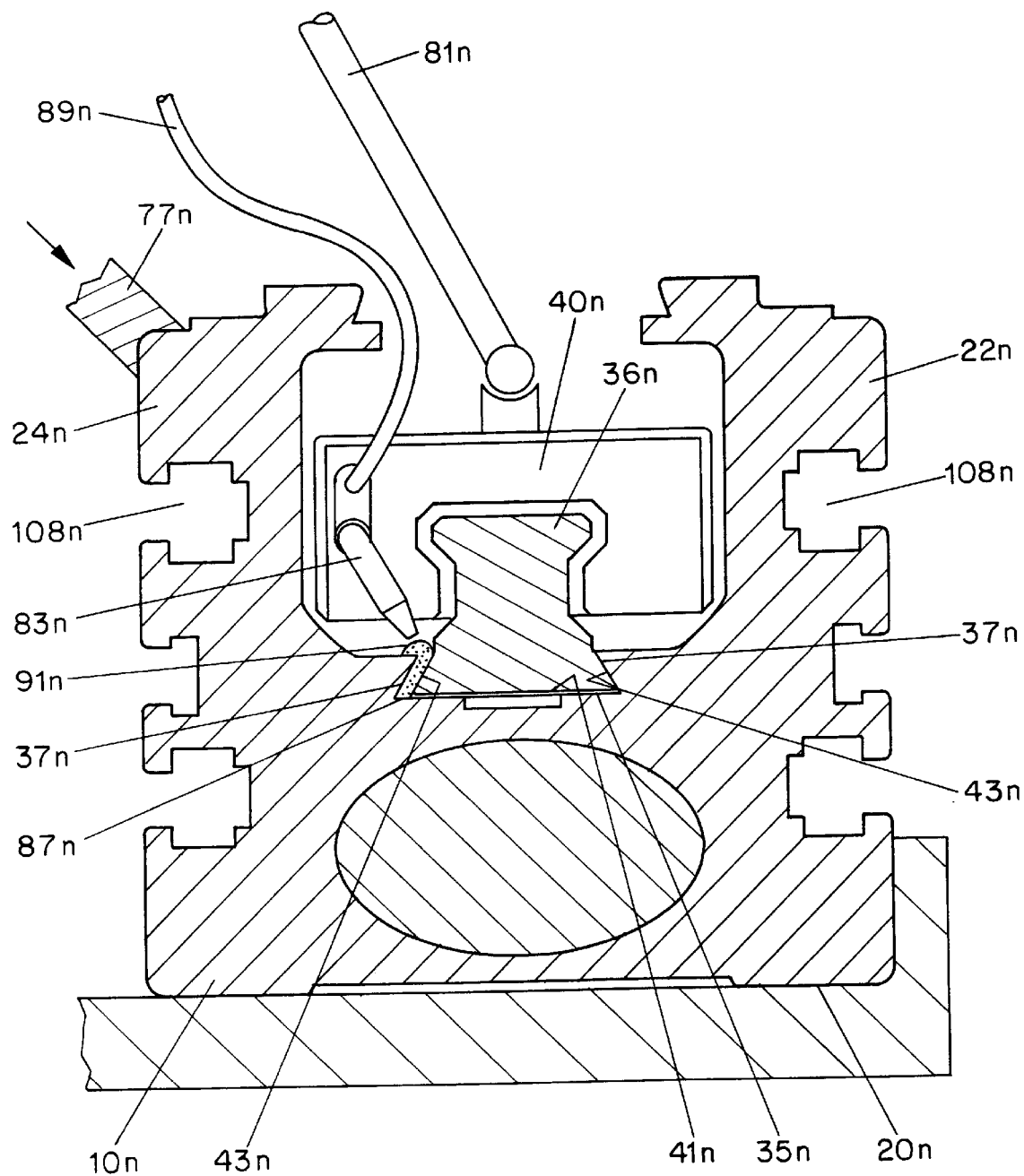

In FIG. 15 there is shown a further method of gap filling. Analogous parts are designated with the same reference numerals as in FIG. 14, the index n replacing the index m. The filling device 83n forms at the exit of the gap 87n a bead 91n of fastening compound so that the compound of the bead can directly flow into the gap 87n.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A linear guiding unit, comprising
an elongate guide housing (10) having a longitudinal axis (A) and wall means confining a guiding cavity, said wall means confining at least one longitudinal opening (31) of the guiding cavity (26),
at least one carriage (40),
said carriage being guided inside the guiding cavity (26) by sliding or/and rolling means (50),
said carriage (40) being connectable through said longitudinal opening (31) with an object to be guided in the direction of said longitudinal axis,
a fluid cylinder cavity (58) being provided inside said guide housing (10) adjacent said guiding cavity (26) and extending substantially along said longitudinal axis (A),
a piston (60) accommodated within said fluid cylinder cavity (58),
said piston (60) being in driving connection with said carriage (40) through at least one pulling member (74), said pulling member (74) being connected to said piston (60) and leaving said fluid cylinder cavity (58) through at least one fluid sealing means which is provided in a terminal area of the fluid cylinder cavity (58), said pulling member being applied after passing said fluid sealing means (72) to at least one pulling member deviating means (78) and running from said pulling member deviating means (78) towards said carriage (40), said sliding or/and rolling means (50) and portions of said pulling member (74) running inside said guiding cavity (26) being substantially completely encapsulated inside said guiding cavity (26), and said encapsulation being provided by at least one flexible covering means (90) which is provided in addition to said at least one flexible pulling member (74).

2. A linear guiding unit as set forth in claim 1, characterized in that the guide housing (10) comprises a bottom wall (20) and two side walls (22,24), said at least one longitudinal opening (31) being located between two respective areas of said side walls (28,30) which are remote from said bottom wall (20).

3. A linear guiding unit as set forth in claim 2, characterized in that at least one guide rail (36) lies on said bottom wall (20) by a foot portion (38), said foot portion (38) being preferably received by a foot portion receiving groove (34) of said bottom wall (20).

4. A linear guiding unit as set forth in claim 2, characterized in that at least one roller track (122d) is provided at both side walls (22d and 24d) of the guide housing (10d) inside the guiding cavity (26d) and that the guide carriage (40d) is provided with rollers (124d), a first group of rollers being in rolling engagement with said at least one roller track (122d) of a first one of said side wall (22d) and a further group of rollers being in rolling engagement with said at least one roller track (122d) of the other (24d) of said side walls.

5. A linear guiding unit as set forth in claim 1, characterized in that said carriage (40) is guided on said at least one guide rail (36) through at least one runner member (42), said runner member (42) having a bridge portion extending across a head portion of the guide rail (36), which head portion is remote from said foot portion and further having two flange portions adjacent respective lateral faces of the guide rail (36).

6. A linear guiding unit as set forth in claim 5, characterized in that the at least one runner member (42) is guided on the guide rail (36) by at least one endless roller body loop (50) which comprises a load transmitting roller body series (52) in simultaneous engagement with a roller track of the guide rail (36) and a roller track of the runner member (42) and further comprises a returning roller body series (54) and an arc-shaped roller body series at both ends of the load transmitting roller body series (52) and the returning roller body series (54).

7. A linear guiding unit as set forth in claim 1, characterized in that the flexible covering means comprise at least one movable covering belt (130f), said covering belt (130f) having a covering portion (142f) covering said at least one longitudinal opening (31f) substantially completely, said at least one movable covering belt (130f) being in driving connection with said carriage (40f) in the area of said at least one longitudinal opening (31f) and being deviated through at least one covering belt deviation means (132f) in at least one terminal area (16f) of said guide housing (10f).

8. A linear guiding unit as set forth in claim 7, characterized in that a returning portion (148f) of said at least one covering belt (130f) extends between respective covering belt deviation means (132f) provided at both terminal areas (12f,14f) of said guide housing (10f).

9. A linear guiding unit as set forth in claim 8, characterized in that the returning portion (148f) runs outside the guiding cavity (26f).

10. A linear guiding unit as set forth in claim 9, characterized in that the returning portion (148f) runs within a covering belt return channel (150f) of the guide housing (10f).

11. A linear guiding unit as set forth in claim 7, characterized in that said movable covering belt (130f), said cylinder cavity (58f), said pulling member (74f) and said longitudinal opening (31f) are arranged substantially symmetrically with respect to a middle plane parallel with respect to said longitudinal axis (A).

12. A linear guiding unit as set forth in claim 11, characterized in that—when regarding a sectional plane orthogonal with respect to said longitudinal axis (A)—the longitudinal opening (31f) with said covering portion (142f) of said covering belt (130f), further a section of said pulling member (74f) connected with said carriage (40f), further a section of said pulling member (74f) connected with said piston (60f) and further said returning portion (148f) of said covering belt (130f) are arranged in a series following said enumeration.

13. A linear guiding unit as set forth in claim 7, characterized in that said at least one longitudinal opening (146g) and said at least one covering belt (130g), on the one hand, and said at least one cylinder space (58g) and said at least one pulling member (74g), on the other hand, are arranged in two mutually spaced planes (ME,AE) which are both in parallel with said longitudinal axis (A).

14. A linear guiding unit as set forth in claim 13, characterized in that a cylinder cavity (58g) with an associated pulling member (74g) is arranged in an intermediate plane (ME) located between two external planes (AE) parallel therewith, a respective longitudinal opening (146g) and a respective covering means (130g) being allocated to each of said external planes (AE).

15. A linear guiding unit as set forth in claim 14, characterized in that a respective runner member (139g) of said carriage (40g) is guided in each of said external planes (AE).

16. A linear guiding unit as set forth in claim 15, characterized in that the runner members (139g) are interconnected by a cross piece (140g).

17. A linear guiding unit as set forth in claim 14, characterized in that said longitudinal openings (146g) are separated from each other by a covering plate (156g), said covering plate (156g) being fastened at axially opposite ends thereof to respective end areas of said guide housing (10g), optionally through transverse members attached to the end areas of said guide housing (10g).

18. A linear guiding unit as set forth in claim 1, characterized in that said flexible covering means (90) is a stationary covering means which is affixed with respect to said guide housing (10) at respective end portions (12,14) of said guide housing (10) which are spaced along the longitudinal axis (A) and that said flexible covering means (90) extends through said carriage (40) substantially in the direction of said longitudinal axis (A).

19. A linear guiding unit as set forth in claim 18, characterized in that said stationary covering means (90) comprise at least one stationary covering belt (90).

20. A linear guiding unit as set forth in claim 18, characterized in that said stationary covering means (90;90b) are provided with mechanical (100) or/and magnetic (121b)

adherence means for adhering to respective edge areas (28,30;28b,30b) of said longitudinal opening (31;31b) outside a respective passage section of said covering means through said carriage (40;40b).

21. A linear guiding unit as set forth in claim 20, characterized in that said stationary covering means (90) extends through a guiding channel (94) of said carriage (40), said guiding channel terminating at both ends thereof substantially in a plane which is defined by the covering position of said stationary covering means (90) with respect to said longitudinal opening (31).

22. A linear guiding unit as set forth in claim 1, characterized in that said pulling member (74) is provided with rounded edges.

23. A linear guiding unit as set forth in claim 1, characterized in that said cylinder cavity (58) has a substantially elliptical cross-sectional area.

24. A linear guiding unit as set forth in claim 1, characterized in that said at least one deviation means, i.e. at least one pulling member deviation means (78f) or at least one covering means deviation means (132f) is accommodated within a deviation encapsulation means (16f) provided at a respective end of said guide housing (10f) in such a way that said at least one deviation means (78f,132f) can be mounted in the respective terminal area of the guide housing (10f) independent of the deviation means encapsulation means (16f), that hereupon the allocated pulling member (74f) and covering belt (130f) can be applied to the premounted deviation means (78f;132f) and that hereupon the respective deviation means encapsulation means (16f) can be applied.

25. A linear guiding unit as set forth in claim 24, characterized in that a pulling member deviating means (78f) and a covering belt deviating means (132f) can independently from each other be mounted in a respective terminal area of said guide housing (10f).

26. A rail unit for a linear guiding unit, comprising:
a rail carrier (10h), said rail carrier having a rail carrier longitudinal axis (T),
at least one guide rail (36h) with a rail longitudinal axis (F) substantially in parallel with said rail carrier longitudinal axis (T), said at least one guide rail (36h) being adapted for guiding at least one carriage (40h) of said linear guiding unit along said rail longitudinal axis (F), said guide rail (36h) having, in cross section, a normal axis (H), a foot portion (38h), a head portion (45h) and lateral guiding areas (47h) on both sides of said normal axis (H), said foot portion (38h) lying on said rail carrier (10h) by at least one foot portion standing face (41h) applied to at least one foot portion application face (35h) of said rail carrier (10h), said foot portion being fastened to said rail carrier (10h) by fastening means (37h,43h) adapted for transmitting at least vertical securing forces,
a circumferentially closed cylinder channel (58k) of a piston cylinder unit (58h,60h) being accommodated inside said rail carrier (10h) on a side thereof remote from said head portion (45h), said piston cylinder unit (58h,60h) being intended and adapted for driving said carriage (40h),
an apex area (S) of said cylinder channel close to said guide rail (36h) being located adjacent said normal axis (H),
a intermediate wall (65h) of said rail carrier (10h), which carries said foot portion (38h) and confines said cylinder channel (58h), having a minimum of wall thickness adjacent said normal axis (H) and having increasing wall thickness in areas of increasing distance from said normal axis (H), and
vertical fastening forces fastening said guide rail (36h) to said rail carrier (10h) being transmitted at least in part at a distance from said normal axis (H) in thickened areas of said intermediate wall (65h).

27. A rail unit as set forth in claim 26, characterized in that the foot portion (38h) comprises at least one foot portion side face (43h) applied to a side face application face (37h) of said rail carrier (10).

28. A rail unit as set forth in claim 27, characterized in that said side face application face (37h) serves as a straightening adjustment face.

29. A rail unit as set forth in claim 27, characterized in that the height dimension of said fastening means (37h,43h) is limited to a height area corresponding to the height of said at least one side face application face (37h) in the direction of said normal axis (H).

30. A rail unit as set forth in claim 26, characterized in that said fastening means (37h,43h) comprise at least partially mutually adapted profiles of said at least one foot portion side face (43h) and an allocated side face application face (37h) of said rail carrier (10h).

31. A rail unit as set forth in claim 30, characterized in that said at least one foot portion side face (43h) and the allocated side face application face (37h) of said rail carrier (10h) are in dovetail type engagement.

32. A rail unit as set forth in claim 26, characterized in that the contact is established between said at least one foot portion side face (43h) and an allocated side face application face (37h) by plastic deformation of the material of said rail carrier (10h) in a step area (59h) of the rail carrier (10h), which step area (59h) is confined by said side face application face (37h).

33. A rail unit as set forth in claim 32, characterized in that the plastic deformation of the material of said rail carrier is the result of embossing a notch (57h) close to said side face application face (37h), said notch (57h) being substantially stable without introduction of filling means.

34. A rail unit as set forth in claim 33, characterized in that said notch (57h) is essentially V-shaped.

35. A rail unit as set forth in claim 34, characterized in that said V-shaped notch (57h) has a first flank more remote from said normal axis (H) and substantially parallel to said normal axis (H) and a further flank closer to said normal axis (H) and substantially parallel to said side face application face (37h).

36. A rail unit as set forth in claim 33, characterized in that said notch (57h) has a notch depth which is substantially equal to the height of said side face application face (37h) in the direction of said normal axis (H) or is larger.

37. A rail unit as set forth in claim 26, characterized in that said foot portion (38h) has an overall dovetail-shaped cross-sectional area and said both foot portion side faces (43h) are in contact with respective side face application faces (37h).

38. A rail unit as set forth in claim 26, characterized in that a first one of two side face application faces (37h) contacting respective foot portion side faces (43h) has a shape and position substantially corresponding to the shape and position as obtained when manufacturing the rail carrier (10h) and that a second one of said side face application faces (37h) has been applied to the respective foot portion side face (43h) by deformation of the rail carrier (10h) as obtained from a manufacturing process.

39. A rail unit as set forth in claim 37, characterized in that each of two side face application faces (37h) is applied by deformation of the rail carrier towards a respective foot portion side face (43h).

40. A rail unit as set forth in claim 32, characterized in that the plastic deformation is the result of a continuous deformation trace (57h).

41. A rail unit as set forth in claim 32, characterized in that the plastic deformation is the result of individual deformation dots spaced in the longitudinal direction of said rail carrier axis (T).

42. A rail unit as set forth in claim 26, characterized in that the wall thickness of said intermediate wall (65h)—in the area of said normal axis (H)—approximately corresponds to the height of said at least one side face application face (37h) along the direction of said normal axis (H).

43. A rail unit as set forth in claim 26, characterized in that said foot portion (38h) is applied by its at least one foot portion standing face (41h) on said at least one foot portion application face (35h) only outside said normal axis (H).

44. A rail unit as set forth in claim 43, characterized in that said foot portion standing face (41h) or/and said foot portion application face (35h) is provided with a respective recess (75h) in the area of said normal axis (H).

45. A rail unit as set forth in claim 26, characterized in that said fastening means comprise a hardened adhesive or filler compound which has been introduced in liquid or viscous state.

46. A rail unit as set forth in claim 45, characterized in that said adhesive or filler compound is provided between said at least one foot portion standing face (41h) and said at least one foot portion application face (35h) or/and between said at least one foot portion side face (43h) and an allocated side face application face (37h).

47. A rail unit as set forth in claim 26, characterized in that said rail carrier (10h) is a guide housing (10h) having a substantially rectangular cross-sectional shape with a bottom wall (20h), two side walls (22h,24h) and an opening slot remote from said bottom wall, said guide rail (36h) being located on one of said three walls: bottom wall (20h) and side walls (22h,24h), the guide rail (36h) being preferably attached to said bottom wall (20h).

48. A rail unit as set forth in claim 26, characterized in that said cylindrical channel (58h) has an elliptical cross-sectional area.

49. A rail unit as set forth in claim 48, characterized in that a shorter axis (k) of said elliptical cross-section is in parallel of said normal axis (H).

50. A rail unit as set forth in claim 48, characterized in that a longer axis of said elliptical cross-section is in parallel with said normal axis.

51. A rail unit as set forth in claim 26, characterized in that said cylinder channel (58h) has an elliptical cross-sectional area, a short axis of said elliptical cross-sectional area being substantially in parallel with said normal axis, said transmission of vertical fastening forces being substantially concentrated outside a distance from said normal axis (H) which distance is larger than about 15% and preferably than about 20% of the length of the longest axis (I) of said elliptical cross-section.

52. A combination of a guide rail (36m) and a rail carrier (10m) of a rail unit, said guide rail (36m) having a foot portion (38m) and being received by its foot portion (38m) in a positioning groove (34m) of said rail carrier (10m), said positioning groove (34m) having at least one undercut side face application face (37m) located above a foot portion side face (43m), wherein for positioning and/or fastening of said guide rail (36m) inside said positioning groove (34m) a fixation compound is provided which has been introduced in a liquid state and has thereupon been hardened.

53. A combination as set forth in claim 52, characterized in that the fixation compound at least partially fills a gap (87m) between said undercut side face application face (37m) and an allocated foot portion side face (43m).

54. A combination as set forth in claim 53, characterized in that the gap (87m) has a gap width of about 0.5 mm to about 2.5 mm and preferably of about 1 mm to about 2 mm.

55. A combination as set forth in claim 52, characterized in that the fixation compound is a conventional adhesive, preferably a more-component adhesive on the basis of polyurethane resin or epoxy resin.

56. A combination as set forth in claim 52, characterized in that said position groove (34m) is undercut at both side face application faces (37m) thereof.

57. A combination as set forth in claim 56, characterized in that one of said undercut side face application faces (37m) is applied to its respective foot portion side face (37m), thus orienting the guide rail (36m) and further characterized in that a gap (87m) is established between the respective other side face application face (37m) and the respective other foot portion side face (43m).

* * * * *

UNITED STATES PATENT AND TRADEMARK OFFICE
CERTIFICATE OF CORRECTION

PATENT NO. : 5,868,499
DATED : February 9, 1999
INVENTOR(S) : Rolan Greubel et al It is certified that error appears in the above-identified patent and that said Letters Patent is hereby corrected as shown below:

Column 4, line 40: "corss-sectional" should read --cross-sectional--.

Column 5, line 26: "cross-sectional" should read --cross-section--.

Column 6, line 58: "cylincdrical" should read --cylindrical--.

Column 7, line 33: "E.g." should read --e.g.,--.

Column 8, line 22: "on" should read --one--.

Column 10, line 4: "Such," should read --Thus,--;
line 18: "true," should read --true--;
line 50: "true," should read --true--.

UNITED STATES PATENT AND TRADEMARK OFFICE
CERTIFICATE OF CORRECTION

PATENT NO. : 5,868,499
DATED : February 9, 1999
INVENTOR(S) : Roland Greubel et al It is certified that error appears in the above-identified patent and that said Letters Patent is hereby corrected as shown below:

Column 11, line 14: "hereafter." should read --thereafter.--;
    line 35: "polyurethan" should read -- polyurethane--;
    line 62: "Introduction" should read --introduction--.

Column 12, line 3: "hereupon" should read --thereupon--;
    line 4: "hereupon" should read --thereupon--;
    line 5: "hereupon" should read --thereupon--;
    line 67: "possible," should read --possible--.

Column 13, line 3: "pressure," should read --pressure--;
    line 6: "feaatures" should read --features--;
    line 16: "overal" should read --overall--;
    line 53: "compound and" should read --compound; and--.

Column 14, line 23: "identic." should read --identical.--.

UNITED STATES PATENT AND TRADEMARK OFFICE
CERTIFICATE OF CORRECTION

PATENT NO. : 5,868,499
DATED : February 9, 1999
INVENTOR(S) : Roland Greubel et al It is certified that error appears in the above-identified patent and that said Letters Patent is hereby corrected as shown below:

Column 15, line 32: "Such," should read --Thus,--.

Column 16, line 44: "in so far" should read --insofar--.

Column 18, line 19: "hereupon" should read --thereupon--;
　　　　　　　line 38: "specification liquid" should read --specification, liquid--.

Column 19, line 55: "hat" should read --that--.

Column 21, line 2: "hereupon," should read --thereupon--;
　　　　　　　line 5: "achieved, one" should read --achieved: one--;
　　　　　　　line 16: "laterial" should read --lateral--;
　　　　　　　line 35: "rail" should read --rails--;
　　　　　　　line 37: "wall" should read --walls--;
　　　　　　　line 39: "rail" should read --rails--;
　　　　　　　line 43: "rail" should read --rails--;
　　　　　　　line 51: "wall" should read --walls--;
　　　　　　　line 67: "b" should read --by--.

UNITED STATES PATENT AND TRADEMARK OFFICE
CERTIFICATE OF CORRECTION

PATENT NO. : 5,868,499
DATED : February 9, 1999
INVENTOR(S) : Roland Greubel et al It is certified that error appears in the above-identified patent and that said Letters Patent is hereby corrected as shown below:

Column 22, line 1: "bei" should read --by--.

Column 23, line 34, claim 4: "wall" should read --walls--;
line 57, claim 7: "comprise" should read --comprises--.

Column 24, line 64, claim 19: "comprise" should read --comprises--.

UNITED STATES PATENT AND TRADEMARK OFFICE
CERTIFICATE OF CORRECTION

PATENT NO. : 5,868,499
DATED : February 9, 1999
INVENTOR(S) : Roland Greubel et al It is certified that error appears in the above-identified patent and that said Letters Patent is hereby corrected as shown below:

Column 25, line 19, claim 24: "i.e." should read --i.e.,--;
line 21, claim 24: "means" (first occurrence) should be deleted and "(132f)" should read --(132f),--.
line 26, claim 24: "means" (first occurrence) should be deleted;
line 54, claim 26: "(58k)" should read -- (58h)--;
line 64, claim 26: "a intermediate" should read --an intermediate--.

Column 27, line 22, claim 45: "comprise" should read --comprises--;
line 44, claim 49: "of" should read --with--.

Column 28, line 10, claim 51: "(I)" should be deleted.

Signed and Sealed this

Seventh Day of November, 2000

*Attest:*

Q. TODD DICKINSON

*Attesting Officer*     *Director of Patents and Trademarks*